United States Patent
Rocha et al.

(10) Patent No.: US 10,159,313 B2
(45) Date of Patent: Dec. 25, 2018

(54) DEPLOYABLE TOUCH FASTENER

(71) Applicant: Gerald Rocha, Bedford, NH (US)

(72) Inventors: Gerald Rocha, Bedford, NH (US); Stephen M. Rocha, Morrisville, VT (US)

(73) Assignee: Gerald F. Rocha, Bedford, NH (US)

( * ) Notice: Subject to any disclaimer, the term of this patent is extended or adjusted under 35 U.S.C. 154(b) by 43 days.

(21) Appl. No.: 15/300,812

(22) PCT Filed: Mar. 31, 2014

(86) PCT No.: PCT/US2014/032398
§ 371 (c)(1),
(2) Date: Dec. 16, 2016

(87) PCT Pub. No.: WO2015/152883
PCT Pub. Date: Oct. 8, 2015

(65) Prior Publication Data
US 2017/0020236 A1    Jan. 26, 2017

(51) Int. Cl.
*A44B 18/00* (2006.01)
*B60N 2/70* (2006.01)

(52) U.S. Cl.
CPC ...... *A44B 18/0073* (2013.01); *A44B 18/0003* (2013.01); *A44B 18/0011* (2013.01); *A44B 18/0015* (2013.01); *A44B 18/0019* (2013.01); *A44B 18/0065* (2013.01); *A44B 18/0069* (2013.01); *A44B 18/0088* (2013.01); *B60N 2/7005* (2013.01); *A44D 2201/02* (2013.01)

(58) Field of Classification Search
CPC ............ A44B 18/0003; A44B 18/0061; A44B 18/0015; B29L 2031/729; A61F 13/62
See application file for complete search history.

(56) References Cited

U.S. PATENT DOCUMENTS

| 1,844,816 A | * | 2/1932 | Brown | A63H 33/38 446/148 |
| 3,128,514 A | * | 4/1964 | Parker | A44B 18/00 2/300 |
| 3,192,589 A | * | 7/1965 | Pearson | A44B 18/0053 24/16 PB |

(Continued)

FOREIGN PATENT DOCUMENTS

| DE | 44 41 095 C2 | 3/1997 |
| DE | 10 2006 015 145 A1 | 10/2007 |

(Continued)

OTHER PUBLICATIONS

International Search Report and Written Opinion dated Sep. 10, 2014 for International Application PCT/US2014/032398.

*Primary Examiner* — Jason W San
(74) *Attorney, Agent, or Firm* — Wolf, Greenfield & Sacks, P.C.

(57) ABSTRACT

Embodiments related to a touch fastener and its methods of manufacture and use are disclosed. In one embodiment, the touch fastener may include a substrate with a first portion and a second portion displaceable relative to the first portion. A first fastening element may be formed in the first portion. When the first portion is displaced relative to the second portion, a force and/or moment generated by the displacement may cause the first fastening element to be deployed.

31 Claims, 19 Drawing Sheets

(56) References Cited

U.S. PATENT DOCUMENTS

| | | | |
|---|---|---|---|
| 3,204,646 A * | 9/1965 | Chamberlin | A45D 2/2478 132/250 |
| 3,497,925 A * | 3/1970 | Brumlik | A44B 18/0015 24/442 |
| 3,927,443 A * | 12/1975 | Brumlik | A44B 18/0015 24/442 |
| 3,995,388 A * | 12/1976 | Penick | G09F 1/06 40/124.08 |
| 4,103,444 A * | 8/1978 | Jones | G09F 1/06 40/124.08 |
| 4,673,383 A | 6/1987 | Bentsen | |
| 4,728,553 A | 3/1988 | Daniels | |
| 5,067,210 A * | 11/1991 | Keyaki | A44B 18/0053 24/442 |
| 5,107,626 A * | 4/1992 | Mucci | B24B 19/028 451/28 |
| 5,110,649 A * | 5/1992 | Morse | A44B 18/0076 24/444 |
| 5,231,738 A * | 8/1993 | Higashinaka | A44B 18/003 24/446 |
| 5,312,456 A * | 5/1994 | Reed | A61F 2/82 24/442 |
| 5,376,410 A | 12/1994 | MacKelvie | |
| 5,586,371 A * | 12/1996 | Thomas | A44B 18/0049 24/306 |
| 5,603,145 A | 2/1997 | Arakawa et al. | |
| 5,669,120 A * | 9/1997 | Wessels | A44B 18/0034 24/445 |
| 5,685,050 A * | 11/1997 | Murasaki | A44B 18/0061 24/442 |
| 5,943,800 A * | 8/1999 | Rose | G09F 1/06 40/124.08 |
| 5,953,797 A * | 9/1999 | Provost | A44B 18/0049 24/304 |
| 5,961,149 A * | 10/1999 | Hunt | A63H 33/38 105/1.5 |
| 5,974,635 A * | 11/1999 | Murasaki | A44B 18/0011 24/442 |
| 5,979,024 A * | 11/1999 | Renwick | A44B 18/00 24/442 |
| 5,981,027 A * | 11/1999 | Parellada | A44B 18/0003 24/442 |
| 6,035,490 A | 3/2000 | Jones et al. | |
| 6,061,881 A * | 5/2000 | Takizawa | A44B 18/0061 24/446 |
| 6,182,338 B1 | 2/2001 | Watanabe | |
| 6,543,099 B1* | 4/2003 | Filion | A44B 18/0049 24/304 |
| 6,544,245 B2* | 4/2003 | Neeb | A44B 18/0003 24/2 |
| 6,588,073 B1* | 7/2003 | Zoromski | A44B 18/0015 24/446 |
| 6,678,924 B2* | 1/2004 | Murasaki | A44B 18/0049 24/306 |
| 6,708,378 B2* | 3/2004 | Parellada | A44B 18/0049 24/304 |
| 6,843,785 B2 | 1/2005 | Hammonds et al. | |
| 6,899,841 B2 | 5/2005 | Buzzell et al. | |
| 6,996,880 B2* | 2/2006 | Kurtz, Jr. | A44B 18/0061 24/446 |
| 7,044,834 B2* | 5/2006 | Chesley | A44B 18/00 428/100 |
| 7,308,738 B2* | 12/2007 | Barvosa-Carter | A44B 18/0003 24/442 |
| 7,584,558 B2* | 9/2009 | Boyd | B42D 15/042 206/308.1 |
| 7,622,180 B2* | 11/2009 | Seth | A44B 18/0046 24/442 |
| 8,082,637 B2* | 12/2011 | Tolan | A44B 18/0003 24/446 |
| 8,316,516 B2 | 11/2012 | Hoehe et al. | |
| 8,499,478 B1* | 8/2013 | Glass | B42D 25/22 40/124.08 |
| 8,683,664 B2* | 4/2014 | Tuma | A44B 18/0003 24/452 |
| 8,683,840 B2* | 4/2014 | Tuma | A44B 18/0003 24/442 |
| 8,701,252 B2* | 4/2014 | Caveney | B65D 63/1018 24/16 R |
| 8,745,827 B2* | 6/2014 | Rocha | A44B 18/0073 24/442 |
| 8,756,770 B2* | 6/2014 | Cina | A44B 18/0049 24/452 |
| 8,898,867 B2* | 12/2014 | Braun | F16B 5/07 24/442 |
| 9,282,790 B2 | 3/2016 | Rocha et al. | |
| 2003/0014033 A1* | 1/2003 | Back | A61F 13/5622 604/391 |
| 2003/0036740 A1 | 2/2003 | Hammonds et al. | |
| 2004/0074071 A1* | 4/2004 | Golden | A44B 18/0096 24/442 |
| 2004/0172792 A1* | 9/2004 | Kurtz, Jr. | A44B 18/0003 24/442 |
| 2004/0187276 A1* | 9/2004 | Seth | A44B 18/0065 24/452 |
| 2005/0079321 A1* | 4/2005 | Tuman | A44B 18/0015 428/100 |
| 2005/0155128 A1 | 7/2005 | Hayes | |
| 2005/0186385 A1* | 8/2005 | Janzen | A44B 18/0049 428/100 |
| 2007/0293118 A1* | 12/2007 | Prescott | A63H 33/38 446/148 |
| 2009/0217492 A1* | 9/2009 | Gallant | A44B 18/0003 24/306 |
| 2010/0038511 A1* | 2/2010 | Golle | A44B 18/0015 248/346.5 |
| 2010/0135600 A1* | 6/2010 | Ducauchuis | A44B 18/0053 383/63 |
| 2010/0257704 A1* | 10/2010 | Tuma | A44B 18/0003 24/449 |
| 2010/0287744 A1 | 11/2010 | Tuma et al. | |
| 2011/0167598 A1* | 7/2011 | Cheng | B60N 2/5833 24/306 |
| 2011/0258819 A1* | 10/2011 | Cheng | A44B 18/0061 24/442 |
| 2012/0204383 A1* | 8/2012 | Wood | A44B 18/0046 24/306 |
| 2012/0321837 A1* | 12/2012 | Adam | A44B 18/00 428/100 |
| 2013/0091667 A1 | 4/2013 | Zerfas et al. | |
| 2013/0196110 A1* | 8/2013 | Cheng | A44B 18/0069 428/99 |
| 2014/0070579 A1* | 3/2014 | Lee | A44B 18/0076 297/219.1 |
| 2014/0138993 A1* | 5/2014 | Cheng | A47C 31/02 297/217.1 |
| 2014/0338159 A1* | 11/2014 | Sakaguchi | A44B 18/0019 24/442 |

FOREIGN PATENT DOCUMENTS

| | | |
|---|---|---|
| EP | 2 075 476 B1 | 4/2012 |
| JP | 03-247306 A | 11/1991 |
| JP | 03247306 A * | 11/1991 |
| WO | WO 2012/014667 A1 | 2/2012 |
| WO | WO 2012/112768 A1 | 8/2012 |

* cited by examiner

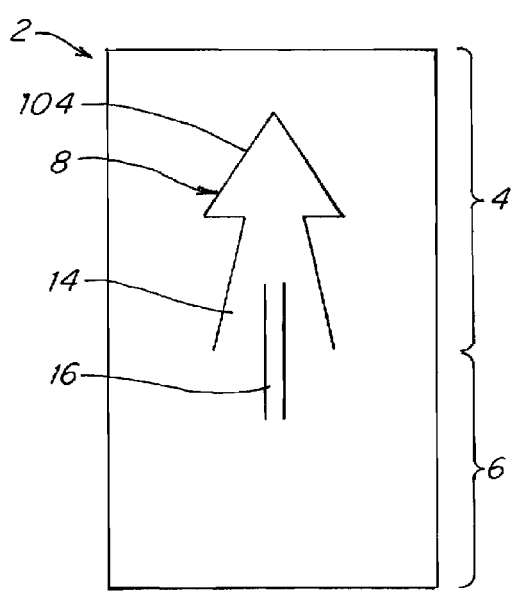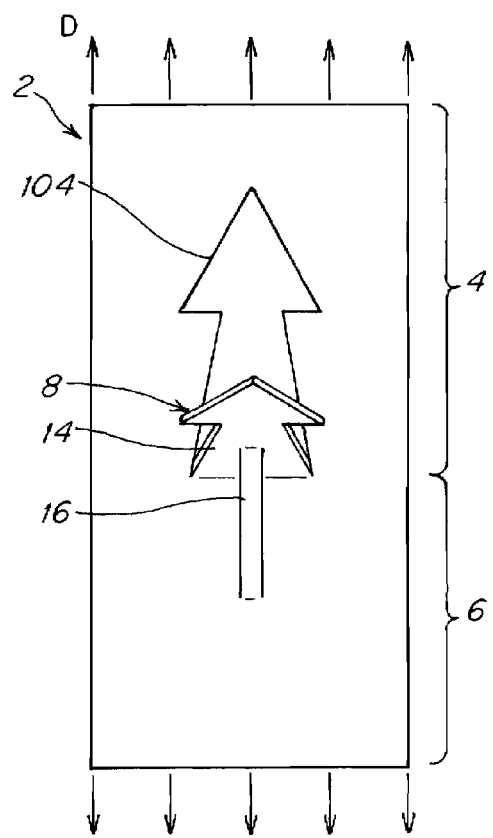
Fig. 5A
Fig. 5B

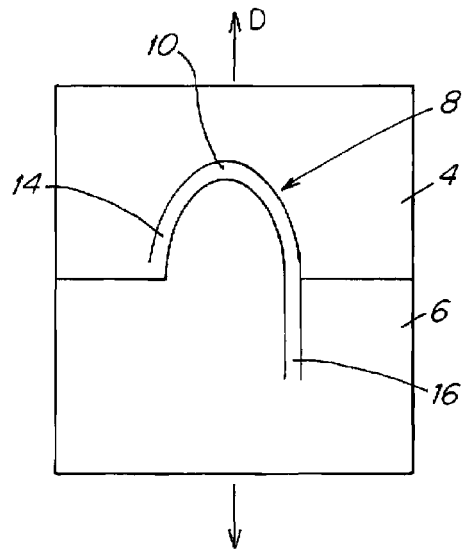
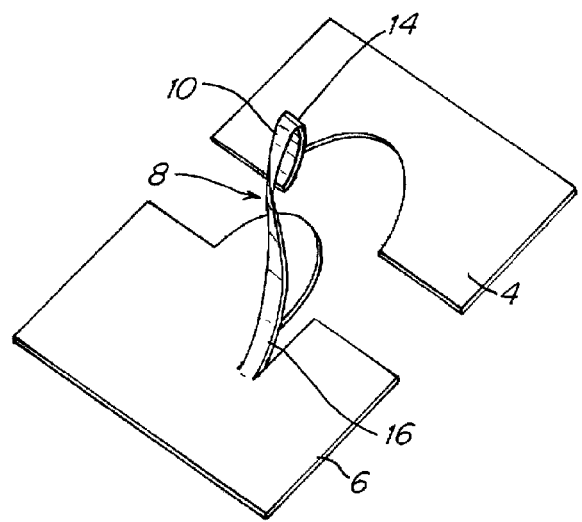
Fig. 8A   Fig. 8B
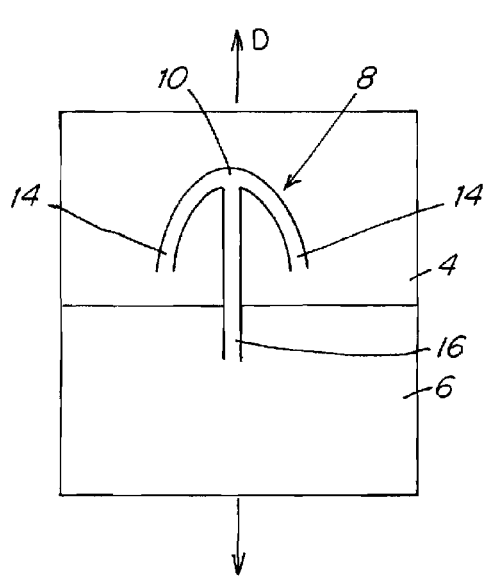
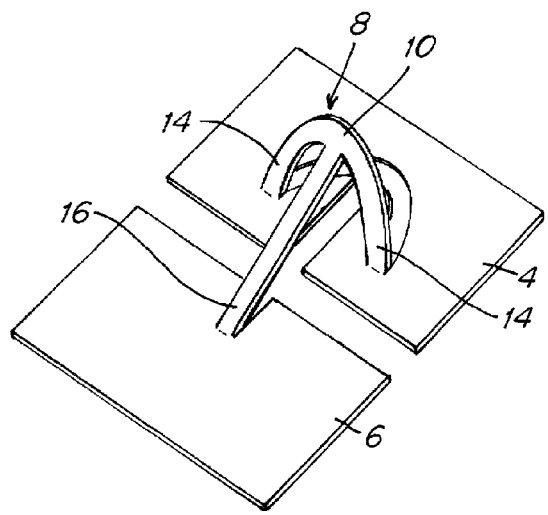
Fig. 9A   Fig. 9B

DEPLOYABLE TOUCH FASTENER

RELATED APPLICATIONS

This application is a national stage filing under 35 U.S.C. § 371 of international application PCT/US2014/032398, entitled "DEPLOYABLE TOUCH FASTENER," filed Mar. 31, 2014, which was published under PCT Article 21(2) in English, the entire contents of which are herein incorporated by reference.

FIELD

Disclosed embodiments are related to a deployable touch fastener.

BACKGROUND

Touch fasteners such as Velcro®, Scotchmate®, and Tri-Hook® were originally produced using textile technology. Two common types of touch fasteners include hook and loop fasteners as well as mushroom and loop fasteners. Hook and loop type fasteners, as they were originally developed and commercialized, consisted of a textile strip including numerous monofilament fastening elements, shaped like hooks, projecting from one surface and another mating textile strip including multifilamented fastening elements woven into loop shaped projections on the opposing mating surface. In the case of mushroom and loop fasteners, the fastener includes a strip containing numerous monofilament projections with mushroom shaped head. The mushroom shaped heads are typically formed by heating the tips of straight monofilament projections until a mushroom head is formed on each projection.

Recently the use of thermoplastic extrusion and molding methods for making touch fasteners have become popular. In the case of hook and loop fasteners, a hook strip may be extruded or molded in a number of different ways. With regards to mushroom and loop fasteners, the mushroom strip may be produced by extruding or molding a strip of material having pin-like projections and subsequently forming mushroom-like heads on the pin-like projections. A mating portion of the touch fastener still typically corresponds to a loop strip produced using woven, knitted, and/or non-woven technologies.

Metal touch fasteners might be made by first forming a plurality of fastening elements in a metal substrate and separately bending each of the individual fastening elements into a deployed state. In such a manufacturing process, the plurality of fastening elements are formed in the substrate using cutting, die cutting, punching, or another appropriate manufacturing process. Punches are then positioned against the individual fastening elements and press the fastening element in order to bend the individual fastening elements into an upright bent position. In this particular type of manufacturing process the plurality of fastening elements are individually bent by separately applying a force directly to each of the fastening elements.

SUMMARY

In one embodiment, a touch fastener may include a substrate with a first portion and a second portion displaceable relative to the first portion. A first fastening element may also be formed in the first portion. When the first portion is displaced relative to the second portion, a force and/or moment generated by the displacement causes the first fastening element to be deployed.

In another embodiment, a method of deploying a touch fastener may include: displacing a first portion of a substrate relative to a second portion of the substrate, wherein a force and/or moment generated by the displacement deploys a first fastening element formed in at least one of the first portion and the second portion.

In yet another embodiment, a touch fastener may include a substrate with a first portion and a second portion displaceable relative to the first portion. A first fastening element may also be formed in the first portion. The first fastening element may include a first stem attached to a fastening portion and to the first portion. A first deployment link may extend between the second portion and either the fastening portion or the first stem of the first fastening element.

In another embodiment, a touch fastener may include a substrate with a first portion and a second portion displaceable relative to the first portion. The touch fastener may also include a first fastening element with a first stem attached to the first portion, a second stem attached to the second portion, and a fastening portion extending between the first stem and the second stem. Displacing the first portion relative to the second portion may displace the first stem towards the second stem to deploy the first fastening element in response to the displacement of the first portion and the second portion.

In another embodiment, a touch fastener includes substrate with a first portion and a second portion that is displaceable in a plane of the substrate relative to the first portion. The touch fastener also includes a first fastening element with sections formed in the first and second portion of the substrate. When the first and second portions are displaced in the plane of the substrate relative to each other, the displacement causes the first fastening element to be deployed out of the plane of the substrate.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 5A is a schematic representation of a deployable fastening element including a continuous substrate;

FIG. 5B is a schematic representation of the deployable fastening of FIG. 5A in the deployed state;

FIG. 8A is a schematic representation of a deployable loop fastening element;

FIG. 8B is a schematic representation of the deployable loop fastening element depicted in FIG. 8A in the deployed state;

FIG. 9A is a schematic representation of a deployable loop fastening element;

FIG. 9B is a schematic representation of the deployable loop fastening element depicted in FIG. 9A in the deployed state;

DETAILED DESCRIPTION

Figures 1A, 1B:
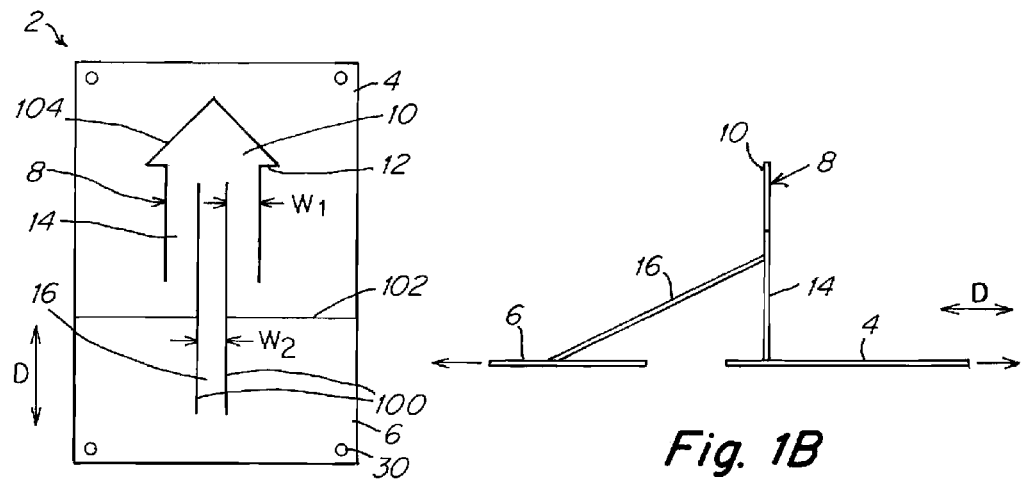
FIG. 1A is a schematic representation of a deployable fastening element formed in a substrate shown in the undeployed state.
FIG. 1B is a schematic representation of the deployable fastening element of FIG. 1A shown in the deployed state.

The inventor has recognized that the cost of molding touch fasteners tends to be driven by the quantity and cost of the raw materials, which are typically various types of polymers. Additionally, the inventor has recognized several limitations associated with the packaging and handling of typical touch fasteners. The inventor has also recognized the limitations associated with using a stamper to separately apply deployment forces to each individual fastening element on a substrate in order to deploy a touch fastener. Additionally, when packaged in roll form, the fastening elements emanating from the top and/or bottom surfaces of a touch fastener tend to make the overall thickness of a fastener strip significantly thicker. This increased thickness limits the amount of fastener strip that may be packaged on a reasonably sized roll. Additionally, the fastener elements may slide relative to adjacent layers on a roll making the package unstable. This instability coupled with the narrowness of a fastener strip roll, which can be less than 1 inch wide, may present handling issues to end users and shippers. Tightly winding a fastener strip roll may provide more stability, but the fastener elements present on the touch fastener strip may be damaged by compressive forces if the roll is wound too tightly. In some applications requiring longer lengths, cross-wound packaging may be used to provide a longer length of fastener per roll, but distortion may be induced in the narrow strip and pose problems in applications that require a straight flat product. Additionally, in instances where a perforated fastener strip is used for example, winding of the fastener strip often times results in the undesirable engagement of fastening elements of one layer with the perforations in the base of an adjacent layer which may again complicate the delivery of a touch fastener strip from a package. Touch fasteners which are attached to garments, such as on coat sleeves and winter-wear, may also become tangled or ensnared on portions of the garment or other garments when laundered.

In view of the limitations associated with typical touch fasteners, the inventor has recognized a need for a touch fastener capable of providing equivalent, or superior, performance and cost as compared to molded products. Such a touch fastener could also consume less raw material. The inventor has also recognized a need for touch fasteners that offer improved handling, stability, packaging efficiency, and/or reduced material distortion when packaged. In some embodiments, it may also be desirable to provide a touch fastener that is deployed simply by displacing portions of a substrate as compared to individually bending each fastening element present within a substrate. In some instances it may also be desirable to provide improved fastening element protection during packing and handling to avoid unwanted damage to the fastening elements. Additionally, the inventor has recognized that in some instances it may be desirable to economically produce fastening element geometries that are not easily produced using typical molding and/or extrusion techniques or from materials that are not easily processed to form touch fasteners. In view of the above, the inventor has recognized the benefits associated with a touch fastener including one or more, or a plurality of, deployable fastening elements. Depending on the embodiment, a deployable touch fastener including one or more deployable fastening elements may either be permanently deployed or the deployment of the deployable fastening elements may be reversible, as described in more detail below regarding the various possible embodiments.

In one embodiment, a deployable touch fastener may include a substrate with one or more portions that are displaceable relative to one another. For example, a substrate might include a first portion, a second portion, a third portion, and/or any number of other portions that are displaceable relative to one another. The one or more substrate portions may include one or more fastening elements formed therein including at least one stem connected to the substrate. Each of the fastening elements may also include a fastening portion either directly, or indirectly, connected to the stem. The fastening portion may correspond to any appropriate element capable of mating with a complimentary fastening element, such as an appropriately shaped head or a loop, as described in more detail below. Depending on the embodiment, each of the fastening elements may be connected to one or more deployment links connected to another one of the substrate portions. Displacing the substrate portions relative to one another results in the displacement of the deployment links. As the deployment links are displaced, they apply a deployment force to the associated fastening elements. This deployment force causes the fastening elements to be displaced about their connection to the associated substrate portion (similar to a living hinge) and into the deployed state. Alternatively, in some embodiments, a fastening element may not be associated with a deployment link. Instead, a fastening element may include two or more separate stems that are displaced relative to each other in order to deploy the fastening element. However other arrangements of deploying a fastening element in response to displacement of portions of a substrate are also possible as the disclosure is not limited to any particular deployment arrangement.

For ease of manufacturing, the substrate may be in the form of a continuous sheet of material such as a continuous strip of material. However, it should be understood that any appropriate geometry, including discrete sheets or patches of material, could also be used. Additionally, the displaceable portions formed in the various types of substrate may be provided in any appropriate manner. For example, the displaceable portions of the substrate may be formed by providing a weakened joint between the portions, cuts located between the portions, or a bond formed between the portions using a deformable material. In some embodiments, the displaceable portions of a substrate does not include any separations or weakened portions between them. Instead, the various portions of the substrate may be continuous with one another such that they form a continuous substrate. In such an embodiment, the continuous substrate may be deformed and one or more stems and/or deployment links at different locations along a length of the substrate may be subjected to different amounts of displacement. These differing amounts of displacement may result in a deployment force being applied to an associated deployable fastening element in order to deploy it as described in more detail below.

Depending on the desired application, the fastening elements may be deployed on either one, or both sides of a substrate. In instances where the fastening elements are deployed on both sides of the substrate, the fastening elements may be deployed in any desired pattern. In one embodiment, the fastening elements might be uniformly deployed on either side of a substrate. Alternatively, the fastening elements might be deployed in discrete sections on either side of the fastening element, as the current disclosure is not so limited. For example, in one specific embodiment, male elements are deployed on one side of a deployable touch fastener and female elements are deployed on the opposing side of the deployable touch fastener to provide a face to back engaging touch fastener. Alternatively, a deployable touch fastener might include a region of male elements on one side of a deployable touch fastener and a separate region of corresponding female elements located on the same side of a deployable touch fastener to provide a face-to-face engaging touch fastener. However, it should be understood that any appropriate arrangement of male and female fastening elements may be deployed on either side of the deployable touch fastener as the disclosure is not so limited.

In some embodiments, it may also be desirable to provide a touch fastener including multiple fastening elements with multiple heights and/or shapes. In one such embodiment, a touch fastener might include a first set of fastening elements with a first height and/or first shape and a second set of fastening elements with a second height and/or second shape that is different from the first. Depending on the application, these different sets of fastening elements may either be provided in separate sections of the touch fastener, or they may be interspersed with one another across the touch fastener surface. For example, a touch fastener including separate sets of fastening elements with different heights and/or shapes in different sections may be arranged to mate with different materials when installed. Alternatively, a touch fastener including interspersed fastening elements with different heights and/or shapes might be mated with a material including loops of different sizes and/or heights to improve the gripping strength. Other applications are also possible.

The fastening elements, deployment links, and/or substrate, may be engineered in any appropriate manner to deploy the fastening elements in a desired direction and pattern as noted above. For example, in one embodiment, additional material, such as an elongated dot of curable adhesive, is selectively added to one or both sides of a deployment link to bias the direction of deployment of a fastening element either towards an upper or lower surface of a substrate depending upon which side of the link the material is deposited. In another embodiment, the deployment links is biased in a desired direction by deforming the deployment links rather than by adding material. For example, a dimple or elongated dimple is impressed onto the upper or lower surface of a deployment link to create the desired bias as noted above. Alternatively, the deployable fastening element itself and/or portions of the substrate might be deformed, using a suitable process such as embossing, to provide a shape or residual strain to bias the fastening elements towards a preselected direction to aid in deployment.

In yet another embodiment, either the deployment link and/or a deployable fastening element may be heated in a desired location prior to deployment to aid in deploying in a desired direction. For example, it may be desirable to heat one side of a connection between the fastening element and substrate, the fastening element itself, and/or a deployment link. Without wishing to be bound by theory, this may lead to a thermal expansion of material on the heated side such that the deployable fastening element deployment direction is biased towards the opposing side of the touch fastener. Heating of a surface may be provided in any appropriate manner. For example, a light absorbent dye, such as a black dye, is provided on a desired surface and an appropriate illumination source, such as an infrared illumination source, may illuminate the surface. The light absorbent dye may absorb a larger fraction of the incident illumination such that the underlying substrate is heated. It should be understood that any appropriate light absorbent dye or material and corresponding illumination source might be used. In another embodiment, a metallic material is coated onto or may be integrated with a desired portion of the substrate. The substrate may then be subjected to a radiofrequency source such that the portions of the substrate associated with the metallic material may be heated. In one specific embodiment, the metallic material is a metallic ink coated onto a surface. Alternatively, the metallic material may be integrated into a separate coating or material layer disposed on the substrate. While specific ways of heating the substrate are described above, other methods of selectively heating portions of the substrate are also contemplated. Additionally, in some embodiments, substrate may be coated with, or made from, a magnetic material. This may help with positioning of the touch fastener using a magnetic positioning system as is used in some automotive applications. For example, the substrate could be coated with a magnetically attractable metallic ink or coating. Alternatively, the substrate could be made from a base material, such as plastic, having a with a magnetically attractable metallic material (whether particles or wires or other structures) embedded therein.

It should be understood that the associated fastening elements, deployment links, and substrate portions may be engineered to provide deployment of a deployable touch fastener in response to a force applied in any desired deformation direction. For example, a touch fastener including deployable fastening elements might be deployed when stretched in a machine direction corresponding to a direction of manufacture of a continuously produced sheet or strip of material, a cross-machine direction perpendicular to the machine direction, or a combination of the machine direction and the cross-machine direction. Additionally, it should be understood that the various portions of a substrate including one or more deployable fastening elements may be displaced in any appropriate direction relative to one another in order to deploy the one or more deployable fastening elements. For example, a first and second portion are displaced away from each other, towards each other, sideways relative to each other along an interface between the substrate portions, or any combination of directions as the disclosure is not so limited. Combinations of the various deformation directions relative both to the machine direction as well as the portions of the substrate are possible. Therefore, it should be understood that the disclosure is not limited to any particular deformation direction of either the substrate or the various portions of the substrate in order to deploy the fastening element.

In some embodiments, it may be desirable to provide one or more mechanisms to aid in controlled deformation of a substrate to deploy one or more deployable fastening elements. Therefore, in at least one embodiment, a substrate may include one or more registration holes and/or marks per portion of the substrate. These registration holes and/or marks may be located along the edges of the substrate or along interior portions of the substrate as the disclosure is not so limited. For example, in one embodiment, registration holes and/or marks located along opposing edges of a strip pass through a corresponding machine applying a deformation to the substrate. In instances where the sides of a substrate and an interior portion of the substrate are deformed relative to one another, registration holes and/or marks may be located on both the sides of the substrate as well as on an interior portion of the substrate. Without wishing to be bound by theory, by controlling the relative displacement of the registration holes and/or marks located along the sides of the substrate relative to the registration holes and/or marks located on the interior substrate, a shear stress may be applied across the substrate. It should be understood that other arrangements of registration holes and/or marks to provide a desired deformation are also contemplated.

In some embodiments, a deployable touch fastener may already be positioned in the deployed state. In such an embodiment, it may be desirable to undeploy the deployable touch fastener. In such an embodiment, the various portions of the substrate including one or more deployable fastening elements may be displaced relative to one another in order to undeploy the fastening elements. This may be done in a manner substantially similar to that described with regards to deploying the deployable touch fasteners described herein, but in reverse. This might be provided for example, by a substrate that is laminated to another underlying material that may be retracted such as an elastomeric material under tension, or other layer that may undergo a contraction. Embodiments in which extension of the substrate results in undeploying of the deployable touch fasteners are also possible.

In some embodiments, cuts forming the fastening elements, deployment links, and/or substrate portions may include features such as termination points and/or sharp corners that may act as stress concentrators. Without wishing to be bound by theory, stress concentrators may result in fracturing of the substrate and/or fastening elements during deployment and use. Additionally, the presence of stress concentrators might also result in reduced fatigue life for a deployable touch fastener that undergoes multiple deployment cycles. Consequently, it may be desirable to provide stress concentration reliefs in a pattern cut into a substrate. For example, a pattern cut into a substrate might include features such as holes, rounds, or other appropriate stress relieving shapes, at the termination points of the cuts and/or at other stress concentration locations such as along abrupt contour transitions. It should be understood, that the pattern may also be designed to include gradual contour changes to reduce the presence of stress concentrations along the cut pattern. However, embodiments in which the cut pattern includes sharp edges, such as are found in an arrowhead shape, are also possible.

As noted above, in some embodiments, the deployable touch fasteners may be formed in a substrate without the need for manufacturing processes that import heat to the substrate. Thus, unlike touch fasteners formed using molding methods where the material is subjected to elevated temperatures, oriented polymers may be used to form a deployable touch fastener. This may offer distinct strength benefits associated with a touch fastener formed from an oriented polymer. Possible oriented polymers include, but are not limited to, oriented para-aramid such as Kevlar®, oriented polyethylene, oriented polypropylene, oriented nylon, and other appropriate oriented polymers. It should be understood that embodiments using unoriented polymers as well as other materials are also contemplated.

The embodiments of a deployable touch fastener disclosed herein may offer one or multiple benefits. For example, traditional touch fasteners use a continuous substrate material in contrast to a deployable touch fastener which may be stretched either along its width or length prior to or during application. Consequently, the deployable touch fastener may be applied to a similar area as a traditional touch fastener while using substantially less material. Additionally, since a deployable touch fastener may be formed in a flat substrate, a deployable touch fastener can be packaged and shipped in a flat form with the deployable fastening elements in the undeployed state which may result in reduced package sizes, increased yardages on a spool, and/or reduced deformation of the substrate and fastening elements during storage and handling.

Without wishing to be bound by theory, depending on the particular deployable touch fastener, the deployable fastening elements may undergo twisting, shearing, and/or a raking action during deployment which may result in the fastening elements engaging more mating fastening elements and thus enhanced engagement between opposing portions of a touch fastener. This may be beneficial for touch fasteners including low profile loops because the twisting, shearing, and/or raking action of the deployable touch fastener may enhance the individual retention force and/or increase the number of loops engaged during attachment. This may consequently result in an increased gripping force between the opposing portions of the touch fastener.

In some embodiments, a deployable touch fastener may also be more flexible as compared to typical touch fasteners because the stretched substrates may include gaps between adjacent substrate portions when deployed which may accommodate stretching and/or bending along the substrate base plane. This increased flexibility may permit bending of a deployable touch fastener without significant distortion of the fastener which is contrasted with the solid substrates of typical touch fasteners which may be distorted when stretched or bent along the substrate base plane.

Depending on the embodiment, a plurality of deployable fastening elements of a deployable touch fastener may either be permanently or reversibly deployed. In embodiments in which the deployment is reversible, the fastening elements, as well as the associated deployment links and portions of the substrate, may include appropriate dimensions, materials, and/or limits on the applied strain to avoid, or at least limit, the amount of plastic deformation and/or fracture during deployment. In such an embodiment, the deployable fastening elements may either fully or partially retract after the substrate has been released to move the fastening elements towards the undeployed state. The substrate may either retract on its own due to the applied elastic strains, or an appropriate elastic material layer capable of retracting the substrate towards the initial undeployed stated may be bonded to the substrate. In the above embodiments, the displacement of the substrate portions relative to one another is at least partially recoverable to at least partially retract the fastening elements. In other embodiments in which it is desirable to permanently deploy the touch fastener, the fastening elements, deployment links, portions of the substrate, and/or other appropriate features may be dimensioned and/or include materials such that one or more elements are irreversibly deformed during deployment to prevent retraction of the substrate afterwards. Alternatively, the touch fastener might be bonded to a material layer in the deployed state to prevent retraction of the substrate and maintain the touch faster in the deployed state.

It should be understood that a deployable touch fastener including deployable fastening elements may be manufactured using any appropriate material, or combination of materials. For example, polymers, papers, papers pre-coated or pre-saturated with a reinforcing material, metals, ceramics, fabrics, composite materials, foamed materials, nonwoven materials, woven materials, knitted materials, glasses, and/or combinations of the above might be used to form a deployable touch fastener. Depending on the particular application, the deployable touch fastener may be made from or coated with a bioresorbable and/or biocompatible material. Alternatively, the deployable touch fastener might be made from a biological material such as, for example, acellular dermal matrix, cartilage, and other appropriate biological materials. In some embodiments, the substrate of a deployable touch fastener may also be a laminated structure including two or more material layers bonded to one another. The substrate may be laminated or otherwise bonded to other layers either before or after deploying the fastening elements. Also, the lamination may occur during formation of the fastening elements, as described below, or the lamination may be prefabricated. Depending on the particular application, the individual material layers within the laminated structure may either be bonded along their entire mating surface areas, along their edges, or within discrete portions along the surface areas as the disclosure is not so limited.

In still yet another embodiment, a deployable touch fastener may be made from a substrate including smaller fastening elements formed on a surface of the substrate. In such an embodiment, separate larger deployable fastening elements may be formed in the substrate. These larger deployable fastening elements may subsequently be deployed as described herein. Since the substrate surface includes smaller fastening elements on its surface, the larger deployable fastening elements will also include the smaller fastening elements on their surfaces. Consequently, when deployed from the substrate, the larger deployable fastening elements will be positioned in the deployed state with one, or a plurality, of separately formed smaller fastening elements located on their deployed surfaces.

In addition to the above, in some embodiments, a material the deployable touch fastener is made to shrink or expand on exposure to fluids such as water and/or from exposure to heat. The material might also shrink and/or expand from exposure to different pH environments and/or chemical reactions. However, it should be understood that the disclosure is not limited to any specific method of controlling the expansion or contraction of the material. The ability to selectively control the expansion and/or contraction of the material might be used during the manufacturing process and/or use to deploy the fastening elements without the need to deform the substrate in a separate mechanical step. Alternatively, these materials might be used to provide a selectively deployable touch fastener by controlling the deformation of the substrate in use.

In some embodiments, a deployable touch fastener may be made from a material that is difficult to form traditional touch fasteners from. For example, polyvinyl chloride is useful for many applications including applications in the medical field due to its ability to be welded using radio frequency welding. However, polyvinyl chloride is difficult to extrude safely and its manufacturing process is corrosive to manufacturing equipment. Consequently, it is difficult to form touch fasteners from polyvinyl chloride. In addition, materials that are either incapable, or difficult to, mold such as thermoset plastics, papers, ceramics, epoxies, metals, and other materials cannot be used in typical molded touch fastener manufacturing techniques. However, in the various disclosed embodiments, patterns are simply formed in a pre-existing substrate to manufacture a deployable touch fastener. Therefore, the deployable touch fasteners may be easily, and cheaply, manufactured in many different materials including, for example, thermoset plastics, papers, ceramics, epoxies, as well as metals to name just a few.

A fastening portion of the fastening elements may have any appropriate shape capable of engaging a mating portion of a touch fastener. For example, the inventors have recognized that since a limited number of fastening elements, typically 10% or less, actually engage with a mating touch fastener, fastening elements including shapes that limit the ability of a corresponding element such as a loop to slide off may provide improved gripping. Several non-limiting geometries that might be used for a fastening portion, include an arrowhead, a mushroom, a single hook, a double hook, a single or double sided saw tooth shape, a sinusoidal shape, a T, a partial circle, a pointed shape, a Y, a star burst, a lightning bolt shape, and/or any other appropriate shape. In some embodiments, the fastening portion may correspond to a straight or tapered pin and/or another similar shape. In such an embodiment, as well as in other embodiments, the fastening portion may be subjected to additional processing in order to properly form the fastening element to function as a touch fastener. For example, the fastening portion may be bent over during a separate processing step or during deployment to form a hook like shape. Alternatively, the fastening portion may be mushroomed using heat or ultrasonics. Another way to mushroom the fastening portion would be apply a metallic coating to the fastening portion and heat the fastening element using radio frequency heating. Additionally, the fastening portion may include a light absorbing ink or material which may be exposed to a light source, such as a laser or other appropriate light source, to heat the fastening portion and form a mushroom shaped head. In yet another embodiment, the fastening portion might also be coated with a suitable material to form a head on the fastening portion. In other embodiments, the fastening element might also correspond to a loop or other appropriate structure capable of connecting to a male portion of a touch fastener. It should be noted, that many of these shapes are not suitable for manufacture using typical molding processes since they cannot slide out of a mold. However, these fastening portion shapes and more are capable of being easily and economically produced using the deployable touch fasteners described herein.

It should be understood that the disclosed touch fasteners may be manufactured in any appropriate fashion. In some embodiments, shapes corresponding to the fastening elements, deployment links, and substrate portions may be cut into a discrete sheet or patch of material, a continuous strip of material, or any other appropriate substrate material to form the desired structure. Consequently, the fastening element might either be formed in a batch process or continuously. Additionally, in some embodiments, the deployable touch fastener may be produced as an integral part of a final product or assembly where the fastener may either be deployed during manufacture or by an end user during use. For example, a deployable touch fastener may be formed directly on the side tab of a disposable diaper or other appropriate product. The deployable touch fastener may also be assembled with appropriate polymer films, non-woven fabrics, woven materials, knitted materials, laminates, adhesives and/or other materials to provide desired functionalities as described in more detail below. While the embodiments described herein are directed to cutting a desired pattern into a substrate, embodiments in which the touch fastener is formed by assembling separately formed fastening elements, substrate portions, and/or deployment links to form the desired structure are also possible.

In embodiments in which the touch fastener is formed by cutting a pattern into a substrate, it should also be understood that the cuts might be formed using any appropriate cutting method including, but not limited to, mechanical, thermal, and/or chemical based methods. For example, intermittent or rotary die cutting, laser cutting, open flame cutting, infrared cutting, machining, water jet cutting, laser ablation, pressure based cutting methods, and other appropriate cutting methods might be used. In other embodiments, a mask might be patterned, or printed, onto a substrate to control or limit exposure of the substrate to cutting methods such as incident radiation, chemical etches, and the like in order to form a desired cut pattern. While an etch might be used with a metallic substrate, etching process might also be used with cellulose-based substrates (e.g. paper), polymer-based substrates, as well as other materials using an appropriate solvent and/or etchant. In embodiments where heat and/or incident radiation are applied, a vacuum may be applied to an underside of the substrate including a mask to aid the localized flow of thermal energy into the substrate through the mask openings. In contrast to forming a mask, in some embodiments, a material may be printed onto a substrate in a desired pattern to enhance the efficiency of some chemical and/or thermal cutting methods. For example, a desired cut pattern may be printed onto a substrate using a material whose composition or color permits infrared energy to cut printed pattern into the substrate. One such method might include printing a black pattern onto a clear polymer substrate and exposing the material to intense infrared energy to cut the polymer substrate. In yet another embodiment, the desired pattern may be formed using additive manufacturing processes. In such an embodiment, a substrate including the desired pattern and substrate portions may be directly printed onto a surface. For example, the pattern might be printed onto a rotating roll or drum such that it may be peeled off to form a continuously printed pattern substrate without the need to separately form cuts. In view of the above, it should be understood that the disclosure is not limited to how a pattern is formed in a substrate to form a deployable touch fastener.

While embodiments describing cuts, gaps, or other appropriate structures that extend through a thickness of a substrate are described above, a pattern formed in a substrate is not limited in this fashion. Instead, in some embodiments, a pattern formed in a substrate may only extend through a portion of the substrate. In such an embodiment, the fastening elements defined by the pattern may shear the remaining material located along the edges of the fastening elements to free the edges of the fastening elements from the substrate as they are deployed. After breaking the partially cut through edges of the fastening elements free from the substrate, the fastening elements may be deployed as described above. Alternatively, in some embodiments, the fastening elements may delaminate from the substrate during deployment. Whether the fastening elements break their connections to the substrate or delaminate from the substrate may be governed by a shear strength of the material, a thickness of the substrate, a thickness of the pattern formed in the substrate, properties of one or more layers within a laminated substrate, and/or other appropriate considerations.

In some embodiments, it may be desirable to alter the properties of a plurality of deployed fastening elements and/or a substrate prior to, during, or after deployment. In such an embodiment, the deployable touch fastener may be coated and/or saturated with one or more materials prior to, during, or after the fastening elements have been deployed. Additionally, the material may either be applied to an entire substrate, a surface of the substrate, individual fastening elements, individual portions of the substrate, and/or any other appropriate location or combination of locations on the substrate as the disclosure is not so limited. Depending on the particular embodiment, the material is applied to the touch fastener by roll coating, spraying, dipping, vapor deposition, and/or any other appropriate coating or application processes. The material may also provide any number of benefits to the touch fastener. For example, the material might provide additional strength, chemical resistance, coloration, bonding, material compatibly, and/or act as a structural component of the touch fastener. Alternatively, or in addition to the above, the coating may act as an adhesive to bond the substrate to another material. Possible materials that might be used to coat and/or saturate a material include polymers, metals, ceramics, epoxies, glasses, abrasives, biocompatible materials, bioresorbable materials, biological materials, magnetic materials, wax, and other appropriate materials. It should be understood, that depending on the embodiment, a material may either be coated onto the entire substrate or only a portion of the substrate. For example, the coating may be applied to only the fastening elements.

In one exemplary embodiment, a deployable touch fastener may be produced from an inexpensive material such as paper, deployed and then coated with a material such as a ceramic slurry that is sintered or cured in a later step to provide added strength and/or durability. Alternatively, the deployable touch fasteners formed from the paper might be coated with a material such as a polymer to strengthen the fastening elements. In such an embodiment, the deployed fastening elements formed from paper simply act as carriers upon which to deposit the structural material, whether ceramic, polymeric, metallic, or other suitable structural material. The above embodiments may enable the inexpensive manufacture of touch fasteners from materials that may otherwise be difficult or impossible to extrude, mold, cut, or form into a fastening element.

In another exemplary embodiment, a coating may be applied to a surface of a substrate to enhance bonding with another material to form a laminate. In one embodiment, the coating may simply be an adhesive that bonds to both the substrate including a deployable touch fastener as well as a corresponding material it is attached to. Alternatively, the coating may be an intermediate material capable of bonding to the substrate and bonding with a separate adhesive or material layer that cannot be easily bonded to the substrate. Appropriate materials that might be used in such a fashion include, but are not limited to, ethylene vinyl acetate, acrylic, UV cured epoxies, polyesters, hot melts, and/or moisture cured hot melts. For example, and without wishing to be bound by theory, applying acrylic, polypropylene, polyethylene, or other appropriate materials to a surface of a paper substrate would enable the paper substrate to be ultrasonically welded to a desired plastic surface or object without the need for a separate adhesive.

In yet another exemplary embodiment, a coating may only be applied to the fastening portions of a deployable touch fastener. One way in which to apply the coating to the fastening portions might include simply dipping the fastening portions into a coating material such as a polymer resin subsequent to curing the polymer. For example, a head of a fastening element, a pin, or other appropriate portion of the fastening element may be dipped into the coating. In some instances, this may enhance gripping to the fastening portion of a mating touch fastener, object, or surface. In other instances, such as the pin embodiment, the coating may form a head for mating with a corresponding portion of a touch fastener. However, it should be understood that the coating may be applied to the fastening portions of the deployable fastening elements in any appropriate fashion as noted previously.

The disclosed deployable touch fasteners may be used in any number of applications where touch fasteners are typically used. However, the disclosed deployable touch fasteners may also be applied in instances where typical touch fasteners are not generally used as the deployable touch fasteners are not limited to any particular application or use. Several possible applications for a deployable touch fastener are described in more detail below.

In one embodiment, a deployable touch fastener may be incorporated into a stretchable tab closure of a disposable diaper. In such an embodiment, an end of the deployable touch fastener, and/or a stretchable tab of the deployable touch fastener is attached to, may be attached to a diaper shell and the user may pull on a free end of the stretchable tab to deploy the fastening elements and attach the stretchable tab to a mating portion of the diaper shell. Without wishing to be bound by theory, typical touch fasteners used for tab closures on disposable diapers often have rough or abrasive surfaces which may come in contact with an infant's tender skin. In contrast, the deployable fastening elements of a deployable touch fastener may remain hidden until the closure tab is stretched and positioned on the surface of a diaper shell, thereby shielding the infant from exposure to the abrasive surfaces typical with conventional touch fasteners.

In another embodiment, a deployable touch fastener may be incorporated into a garment. In such an embodiment, it may be desirable for the deployable touch fastener to be selectively movable between a deployed and undeployed state. This may offer multiple benefits. For example, touch fasteners that are attached to garments, such as on coat sleeves and winter-wear, are often tangled or ensnared on portions of the garment or other garments when laundered. In contrast, a deployable touch fastener positioned in the undeployed state when not in use may be less prone to tangling and/or ensnaring portions of the garment and other garments as compared to a typical touch fastener.

In yet another embodiment, a deployable touch fastener may be incorporated into various automotive applications. For example, a deployable touch fastener may be positioned in an automotive seat bun for attaching an associated fabric cover. While the deployable touch fastener may be positioned in the automotive seat bun in any appropriate fashion, in one embodiment, the deployable touch fastener may be deployed and positioned within a channel formed in the automotive seat bun. Subsequently, a material may be foamed around the deployable touch fastener to attach the deployable touch fastener the automotive seat bun.

In another embodiment, a deployable touch fastener might be used as a surgical fastener. For example, a deployable touch fastener might be used to attach two opposing portions of tissue to one another during a surgical procedure. In such an application, the deployable touch fastener may be engineered to behave elastically during and after deployment to provide a desired resilient closure force to hold a wound together. In another embodiment, a deployable touch fastener might be used in a surgical procedures such as a hernia repair. The deployable touch fastener might serve as a reinforcing material as well as a method for attaching the reinforced material to surrounding tissue such as an abdominal wall. Thus, in such an embodiment, the deployable touch fastener might replace separate attachment mechanisms such as stitches, tacks, clips, and other attachment methods currently used in conjunction with various tissue repair materials such as surgical repair fabrics. In some applications, a porosity of a deployable touch fastener may be engineered by the patterning of fastening elements, holes, the use of appropriate laminates, and other appropriate methods to enhance tissue integration with the deployable touch fastener after implantation. Depending on the particular application, a deployable touch fastener may include substrates and/or coatings made from biological materials, biocompatible materials, bioresorbable materials, and/or their appropriate materials. Depending on the particular application, it may be desirable for a fastener to provide medication to a site. Therefore, in some embodiments, a touch fastener may be engineered to be drug eluting to provide a therapeutic compound to the site or application. A deployable touch fastener used for a medical procedure might include alternative methods for fastener deployment such as elevated temperatures from the body, (e.g., by employing nitinol), moisture, chemical reactions, and/or pH as described above. Further, a deployable touch fastener might be deployed either prior to positioning on tissue or the deployable touch fastener might be deployed after final positioning of a deployable touch fastener during a surgical procedure as the disclosure is not so limited.

In yet another embodiment, a side of a deployable touch fastener opposite the fastening elements might be coated with an abrasive material and the deployed touch fastener might be attached to a sanding apparatus. The resulting material may thus be used as sandpaper. In a related embodiment, a deployable touch fastener may include fastening elements deployed on one side of the deployable touch fastener and one or more elements deployed on an opposing side of the deployable touch fastener. In such an embodiment, the fastening elements may be attached to a sanding apparatus as noted above. In addition, the one or more elements deployed on the opposing side may be coated or encapsulated with an abrasive material so as to function as a bristle-like sanding pad including an open structure. Without wishing to be bound by theory, the open structure of the deployed substrates noted above might also permit a vacuum or airflow through the sandpaper to permit the extraction of dust particles generated during use. While a specific arrangement has been noted above for providing an abrasive pad, other arrangements are also contemplated.

Turning now to the figures, several non-limiting embodiments are described in more detail.

Figures 2A, 2B:
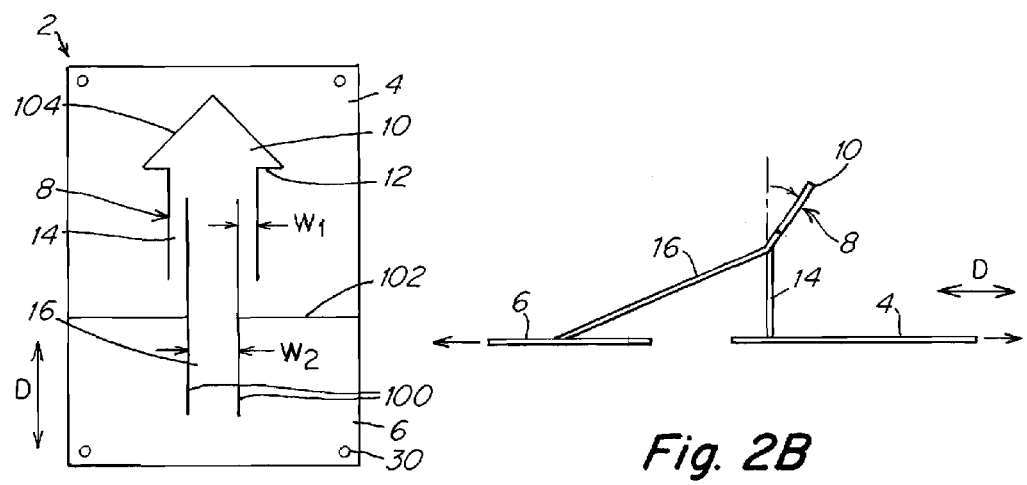
FIG. 2A is a schematic representation of another deployable fastening element formed in a substrate shown in the undeployed state.
FIG. 2B is a schematic representation of the deployable fastening element of FIG. 2A shown in the deployed state.

FIGS. 1A and 2A depict possible embodiments of a deployable touch fastener. In the depicted embodiments, the deployable touch fastener includes a planar substrate 2. The substrate 2 is divided into a first portion 4 and a second portion 6 demarcated by line 102. However, it should be understood that any number of substrate portions could be used. A fastening element 8 is formed in the first portion 4. The fastening element includes at least one stem 14 including one or more portions. The stem 14 may also be connected to a fastening portion 10 of the fastening element. The fastening portion 10 may have any appropriate shape capable of engaging with a mating object or surface. For example, as depicted in the figure, the fastening portion 10 may correspond to a barbed arrowhead including an overhanging shoulder 12. This type of fastening portion 10 may help to engage with elements on a mating object or surface to prevent the mating structure from slipping off of the fastening elements. However, as described in more detail below, other types of shapes including mushroom, hook, and loop shapes may be used for the fastening portion 10 as the disclosure is not so limited.

The deployable touch fastener may also include one or more deployment links 16 extending between, and attached to, either the stem 14 or fastening portion 10 of the fastening element and the opposing second portion 6 of the substrate. While a single deployment link 16 arranged symmetrically between two opposing stems 14 has been depicted in the figures, other arrangements are also possible. For example, any number of deployment links and any number of stems could be used. Additionally, either a symmetric arrangement, or a non-symmetric arrangement, of deployment links and one or more stems might be used.

While the substrate portions, fastening elements, and deployment links may be formed in any appropriate fashion, one embodiment of a pattern used to form these elements is illustrated in the figures. Referring again to FIGS. 1A and 2A, the deployment link 16 is provided by two parallel lines 100 cut or otherwise formed in the substrate 2 and generally aligned with a deployment direction D of the fastening element 8. Two generally perpendicularly arranged lines 102 extend outwards from approximately a midpoint of the cuts 100 to form the first portion 4 and second portion 6 of the substrate. While lines 102 are depicted as extending outwards from a midpoint of the line 100, lines 102 may also be located at an end of lines 100 such that they form a tab extending from the second portion 6 of the substrate to the fastening element 8. Other locations of lines 102 are also contemplated. In some embodiments, a line 104 may be formed within the first portion 4 of the substrate extending around the deployment link 16 to form both a fastening portion 10 and stem 14 of a fastening element 8. However, embodiments in which the line 104 does not extend around the deployment link 16 are also contemplated. Again, while specific shapes of these lines and corresponding substrate portions, fastening elements, and deployment links have been depicted in the figures and described above, other shapes are also possible. For example, instead of a line, a larger shape, such as a window that frames the fastening element, might be cut out from a substrate to form the fastening element. Additionally, it should be understood that the depicted lines might correspond to cuts formed in a substrate or they might correspond to gaps and/or spaces molded into a substrate during an appropriate formation process as the disclosure is not limited to how these features are formed. Alternatively, and as described in more detail below, the individual portions of the substrate may form a continuous substrate as the disclosure is not so limited.

As depicted in FIGS. 1A and 2A, a deployable touch fastener 2 may also include one or more registration holes or marks 30. The registration holes or marks 30 may be located either along an edge of the substrate, or in some embodiments, the registration holes or marks may also be located along an interior portion of the substrate. The registration holes or marks may help a corresponding machine to appropriately feed and/or deform the substrate during a manufacturing process.

Having described the general arrangement of a deployable touch fastener, FIGS. 1B, 2B, 4A, and 4B illustrate the deployment of these fasteners. As illustrated in the figures, the first portion 4 and the second portion 6 of a substrate are displaced relative to one another in a deployment direction D indicated by the arrows. Since the deployment link 16 is attached to both the fastening element 8 and second portion of the substrate 6, the deployment link 16 is also displaced in the deployment direction D. As illustrated in the figures, the displacement of the substrate in the deployment direction D is located within a plane of the substrate. While this displacement has been illustrated as being a linear displacement within a single flat plane, this displacement within a plane of the substrate might also be accomplished using sets of rollers or any other arrangement capable of displacing a first portion of the substrate relative to a second portion of the substrate. In either case, as the deployment link 16 is displaced, it applies a deployment force and/or moment to a portion of the fastening element 8 it is attached to. This deployment force and/or moment generated by the displacement of the first and second portions causes the fastening element to rotate about the attachment between stem 14 of the fastening element and the first portion 4 of substrate into a deployed position. Once fully deployed, fastening element 8 may be oriented generally in an upright deployed position, as shown in the figures. While the force and/or moment applied to deploy the fastening element is provided by a deployment link in the present embodiment, as described in more detail below, this deployment force and/or moment may be applied to the fastening elements without the use of a deployment link as well.

Figure 4A:
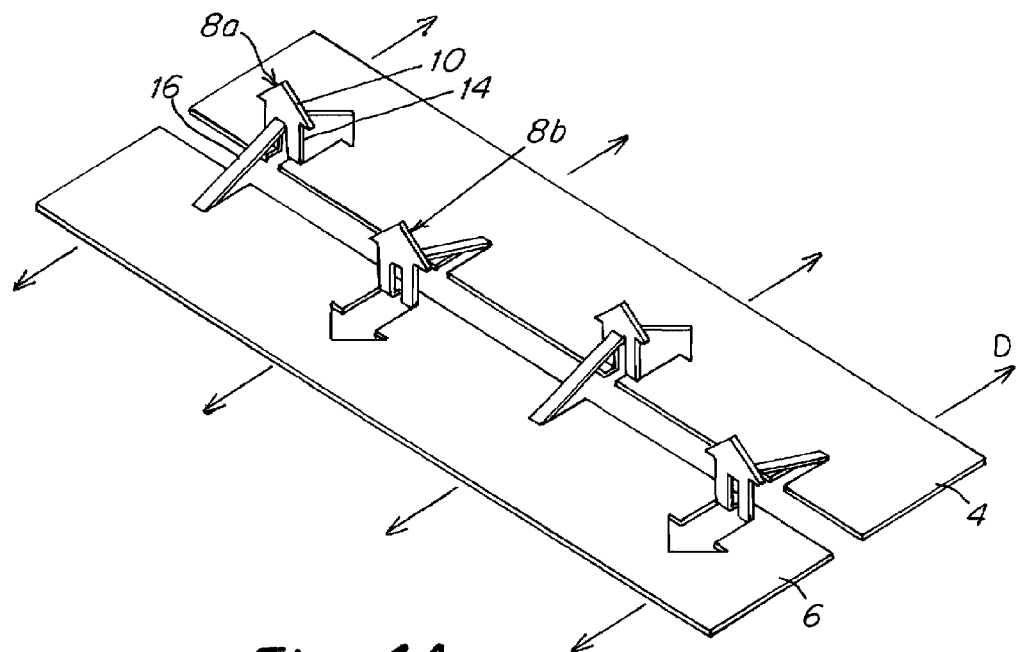
FIG. 4A is a schematic representation of a plurality of deployable fastening elements formed in a substrate in the deployed state where the fastening portions of the deployable fastening elements remain substantially straight when deployed.

Referring again to FIGS. 1A and 2A, a stem 14 of the fastening element may have one or more stems with widths $w_1$ and one or more deployment links with a width $w_2$. The widths $w_1$ of the one or more stems 14 may be selected to be sufficient to support a fastening element during deployment, engagement with a mating object or surface, as well as subsequent loading of the deployable touch fastener. Additionally, the widths $w_2$ of the one or more deployment links may be selected to ensure full deployment of the fastening element without fracturing. In addition to the above, the relative widths of these elements may be selected to control the deployment behavior of the fastening portion 10 of the fastening element. Without wishing to be bound by theory, smaller width deployment links may permit the fastening portion 10 to remain substantially aligned with the stem 14 of the fastening element when in the deployed state as illustrated in FIGS. 1A, 1B, and 4A. In contrast, and without wishing to be bound by theory, wider deployment links may result in the fastening portion 10 of the fastening element either being bent over in the deployed state such that it is aligned with the one or more deployment links or oriented at an angle in between an orientation of the stem 14 and one or more deployment links 16 as illustrated by FIGS. 2A, 2B, and 4B.

Embodiments in which the fastening portions 10 of a fastening element are bent over in the deployed state may offer multiple benefits. For example, the bent over fastening portion 10 of the fastening element may be located in an orientation somewhat parallel to and spaced from an associated substrate 2. This may facilitate engagement of the fastening element fastening portion with a complementary mating element, such as a loop. For example, and without wishing to be bound by theory, if the fastening portion 10 of the fastening element is shaped in the form of an arrowhead, the bent over fastening portion may facilitate engagement with a low profile loop while also improving the strength of the resulting mechanical bond.

Figure 3A:
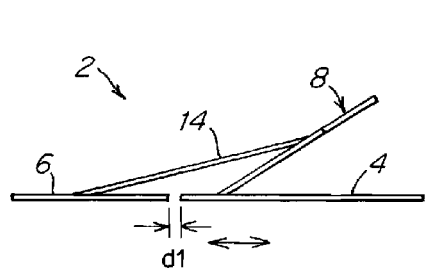
FIG. 3A is a schematic representation of a deployable fastening element in a partially deployed state.
Figure 3B:
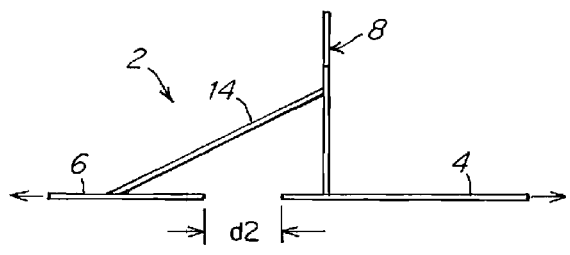
FIG. 3B is a schematic representation of a deployable fastening element in a fully deployed state.

In some embodiments, and as depicted in FIGS. 3A and 3B, a deployable touch fastener 6 may initially be positioned in a partially deployed state prior to being fully deployed. In such an embodiment, a deployable touch fastener may include a substrate 2 with a first portion 4 and second portion 6 that have been displaced relative to one another by an initial displacement d1, see FIG. 3A. As depicted in the figure, the deployment link 14 has also been displaced and the deployable touch fastener 8 has been partially deployed as well. Upon further displacement d2 of the first and second portions 4 and 6, the deployment link 14 is also displaced further and the deployable fastening element 8 may be fully deployed as depicted in FIG. 3B.

Figure 4B:
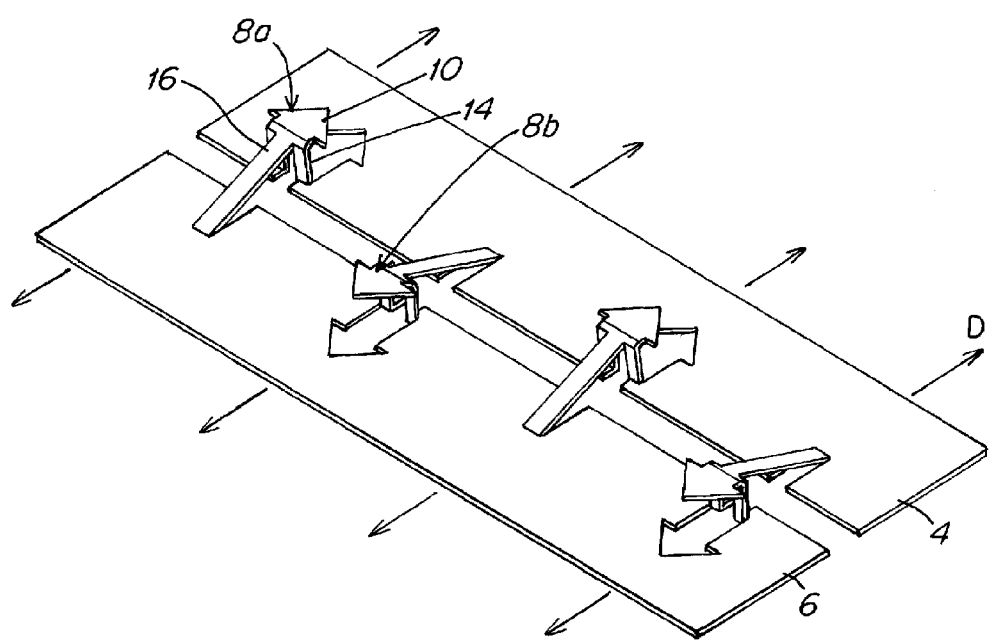
FIG. 4B is a schematic representation of a plurality of deployable fastening elements formed in a substrate in the deployed state where fastening portions of the deployable fastening elements are bent when deployed.

FIGS. 4A and 4B illustrate an embodiment of a deployable touch fastener including fastening elements 8 arranged in an alternating fashion on opposing portions of a substrate. For example, a first fastening element 8a may be arranged on a first portion 4 of substrate and a second fastening element 8b may be arranged on an adjacent second portion 6 of the substrate. This pattern might be continued across either the width and/or length of the substrate. When a deployable touch fastener is deployed by a force as indicated by the arrows, the deployment links 16 deploy various fastening elements 8a and 8b located on either side of the gap formed between the first portion 4 and second portion 6 of the substrate in the deployed state. In the case of the fastening portions bending over as illustrated in FIG. 4B, this arrangement of fastening element 8 may be beneficial in that the fastening portions 10 of the various fastening elements are oriented in different directions which may improve engagement with a mating portion of the deployable touch fastener. It should be understood that while a single alternating pattern of fastening elements has been depicted, other patterns and arrangements of the fastening elements on two or more portions of a substrate are also contemplated.

FIGS. 5A and 5B depict one embodiment of a substrate 2 including a first portion 4 and a second portion 6 that are continuous and do not include a cut or weakening between the two portions. Similar to the above, a deployable touch fastener 8 may be defined by a line 104 forming an appropriately shaped pattern in the substrate. Additionally, a deployment link 16 may be associated with a stem 14 or other portion of the deployable touch fastener. Upon application of a force as depicted in FIG. 5B, the substrate 2 may be deformed from a first length to a second length. Since the deployable fastening element 8 and deployment link 16 are at least partially decoupled from the surrounding substrate, the deformation applied to the substrate does not substantially deform either the deployable fastening element 8 or the deployment link 16. Consequently, as the substrate is stretched, the position where the deployment link 16 is connected to substrate 2 is displaced relative the position where the stem 14 of the deployable fastening element is attached to the substrate. This displacement of the displacement link 16 relative to the stem 14 results in the deployable touch fastener 8 moving towards a deployed position. The amount of substrate deformation needed to fully deploy a fastening element may be engineered using parameters such as where the deployment link is attached to the stem as well as the length of the deployment link. While a separately formed fastening elements and deployment link have been depicted in the figures, as described in more detail below, fastening elements that do not include a separately formed deployment link and/or do not include a deployment link are also possible and may be used in an embodiment with a continuous substrate.

Figure 6:
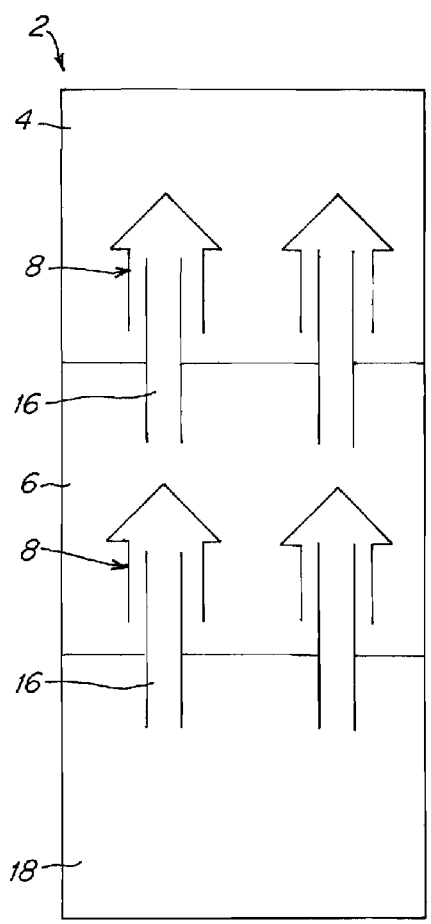
FIG. 6 is a schematic representation of a plurality of deployable fastening elements formed in a plurality of separate portions of a substrate.

As noted above, a deployable touch fastener may include any number of substrate portions including multiple deployable fastening elements. FIG. 6 illustrates one such embodiment. As depicted in the figure, a deployable touch fastener may include a substrate 2 including a first portion 4, a second portion 6, and at least a third portion 18. Depending on the embodiment, both the first portion 4 and second portion 6 of the substrate may include either one, or a plurality, of fastening elements 8 formed therein. Each of the fastening elements 8 formed within the first portion 4 of the substrate may be connected to one or more deployment links 16 extending between the fastening elements and the second portion 6 of the substrate. Additionally, each of the fastening elements 8 formed within the second portion 6 of the substrate may similarly be connected to one or more deployment links 16 extending between the fastening elements and the third portion 18 of the substrate. A similar arrangement may be used for any number of substrate portions and any desired width of substrate. The fastening elements 8 may be deployed in a manner similar to that described above with regards to FIGS. 1A-4B. Additionally, other patterns and arrangements of the fastening elements and/or deployment links relative to each other and the various portions of the substrate are also possible.

Figure 7:
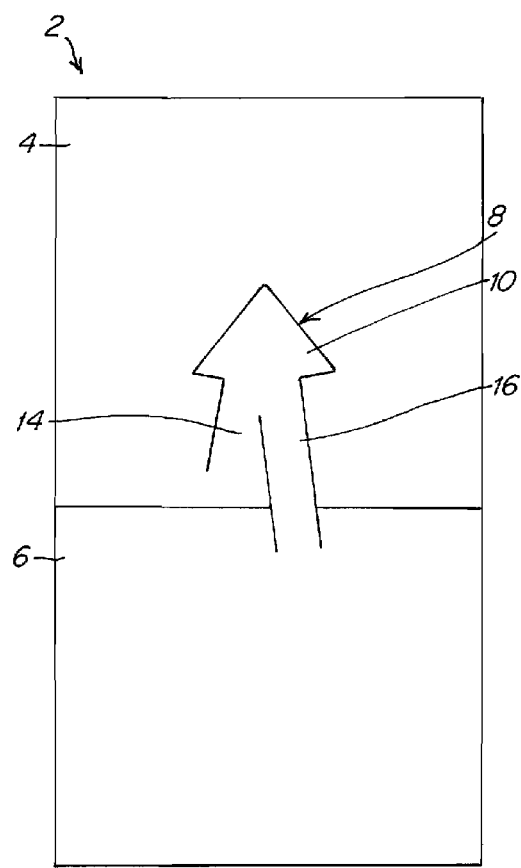
FIG. 7 is a schematic representation of a deployable fastening element including a deployment link that applies a non-symmetric deployment force to the fastening element during deployment.

As noted above, raking and/or twisting of the fastening elements during deployment may enhance engagement between mating portions of a touch fastener. Consequently, and without wishing to be bound by theory, in some embodiments, the inventors have recognized that it may be desirable to apply a non-symmetric deployment force to a fastening element to impart a twisting motion during deployment. One possible arrangement for applying a non-symmetric deployment force to a fastening element is depicted in FIG. 7. As depicted in the figure, a single deployment link 16 is attached to a side of a fastening element 8 adjacent to a stem 14 of the fastening element in a non-symmetric arrangement. Consequently, depending on the width, shape (e.g. straight, curved, etc.), and orientation of the stem and deployment link, the deployment link 16 may apply a non-symmetric deployment force to the stem 14 when the first portion 4 and second portion 6 of the substrate are displaced relative to one another. Consequently, depending on the particular design, the depicted fastening element may be deployed in a straight fashion as described above, or it may be deployed in a manner that provides a twisting motion. While a single non-symmetrically arranged deployment link has been depicted in the figures, configurations including multiple deployment links arranged to apply a non-symmetric deployment force to the fastening element are also contemplated as the disclosure is not so limited.

FIGS. 8A and 8B depict an embodiment of a fastening element 8 in the shape of a loop. In the depicted embodiment, the fastening element includes a stem 14 attached to a first substrate portion 4. The stem 14 is attached to a rounded fastening portion 10 that forms the loop when deployed. On the opposing end the fastening portion 10 is attached to a deployment link 16 that extends into a second substrate portion 6. As illustrated in FIG. 8B, when the two substrate portions 4 and 6 are moved away from each other, the deployment link 16 applies a deployment force to the fastening portion 10 to deploy the fastening element and form a loop.

FIGS. 9A and 9B depict another embodiment of a fastening element 8 in the shape of a loop. In this embodiment, a fastening element includes two opposing stems 14 connected to opposite ends of a loop shaped fastening portion 10 formed in a first substrate portion 4. A separate deployment link 16 extends from a second substrate portion 6 to the fastening portion 10. Similar to the above, as the first and second portions are moved apart the deployment link 16 applies a deployment force to the fastening portion to move it to the deployed state as shown in FIG. 9B.

FIGS. 10A-11B depict two different embodiments of deployable fastening elements that do not include a separate deployment link. Instead, the fastening element 8 is formed in a substrate including a first substrate portion 4 and a second substrate portion 6. The fastening element 8 may include separate first and second stems 14a and 14b formed in and attached to the two opposing substrate portions. A fastening portion 10 may be disposed between the separate stems. As depicted in the figures, the second stem 14b may be located on an end of the fastening element 8 located opposite the first portion 4. Similarly, the first stem 14a may be located on the other end of the fastening element opposite the second portion 6. Additionally, the first and second portions may be shaped such that the first portion 4 is attached to the second stem 14b and the second portion 6 is attached to the first stem 14a. Therefore, as the first and second portions 4 and 6 are moved away from each other as indicated by the arrows D, the separate first and second stems 14a and 14b are displaced towards one another. Since the fastening portion 10 remains the same length, the deployable touch fastener 8 is displaced upwards into a deployed state, see FIGS. 10B and 11B. Depending on the embodiment, a profile of the fastening portion 10 may either be formed to provide a female fastening element such as the loop shown in FIG. 10B, or it may be shaped to provide a male fastening element such as the barbed arrow shown in FIG. 11B.

Figures 10A, 10B:
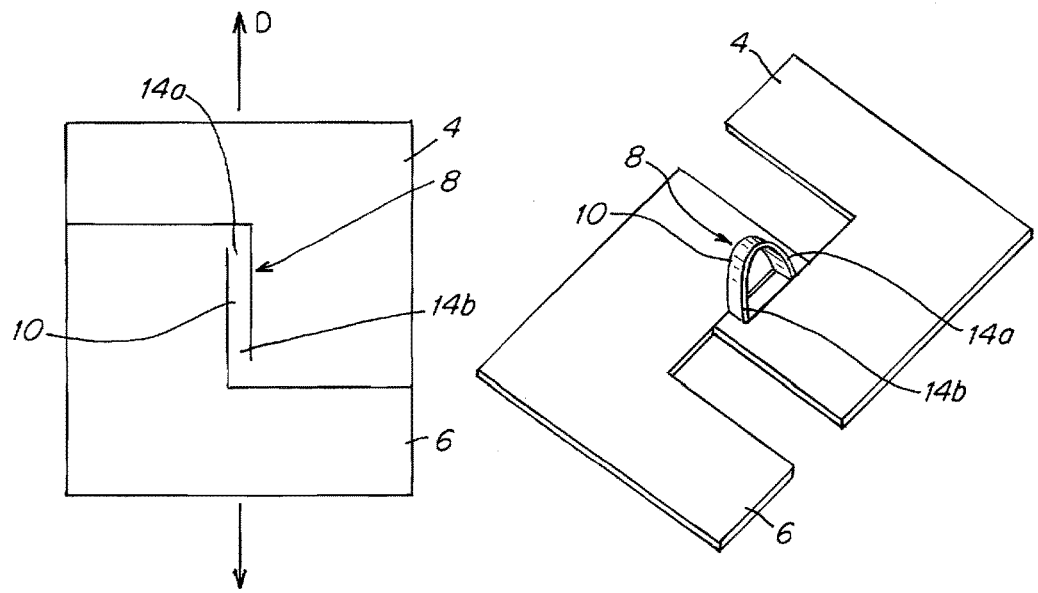
FIG. 10A is a schematic representation of a deployable loop fastening element that is deployed by displacing two opposing stems towards each other.
FIG. 10B is a schematic representation of the deployable loop fastening element depicted in FIG. 10A in the deployed state.
Figures 11A, 11B:
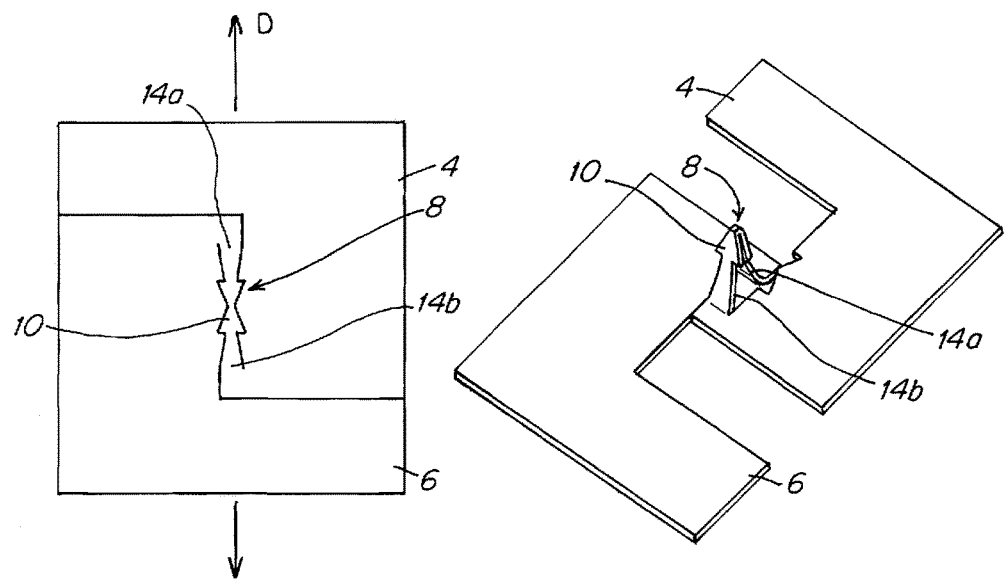
FIG. 11A is a schematic representation of a deployable male fastening element that is deployed by displacing two opposing stems towards each other.
FIG. 11B is a schematic representation of the deployable male fastening element depicted in FIG. 11A in the deployed state.

It should be understood that fasteners including differently shaped fastening portions might also be used. In some embodiments including, for example, forming a loop as shown in FIG. 10B, it may be desirable to limit the displacement of the first and second substrate portions 4 and 6 prior to the stems 14a and 14b contacting one another. Limiting this displacement may ensure a desired loop width and height is provided so that the resulting loop may be easily engaged. However, in some embodiments, it may be desirable to displace the first and second substrate portions 4 and 6 until the opposing stems 14a and 14b contact one another as might be the case for the male fastener shown in FIG. 11B. While the fastening portions 10 depicted in FIGS. 10A-11B have been depicted as being arranged parallel to a deployment direction of the substrate, embodiments in which the fastening portions are oriented at an angle relative to the deployment direction and the substrate portions are also possible.

In view of the embodiments depicted in FIGS. 10A-11B, it should be appreciated that in some embodiments, the first and second stems located in the first and second portions of the substrate may extend up to the fastening portion of a fastening element. The first and second stems may then function to deploy the fastening element when the first and second portions of the substrate are displaced relative to one another. In such an embodiment, the first and second stems function as deployment links without the need for a separately formed feature. It should also be understood that this concept applies both to embodiments such as those discussed above in reference to FIGS. 10A-11B as well as other embodiments discussed herein including, for example, FIG. 7 where the deployment link might be interpreted as a second stem extending from the second portion of the substrate to the fastening portion.

Figure 12A:
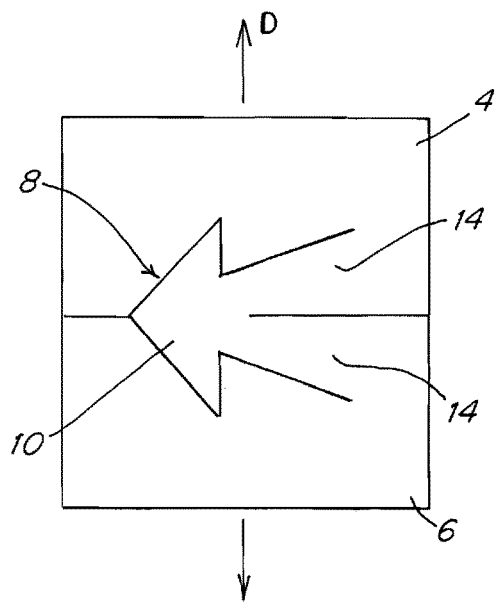
FIG. 12A is a schematic representation of a deployable fastening element oriented in a perpendicular fashion relative to the opposing substrate portions.
Figure 12B:
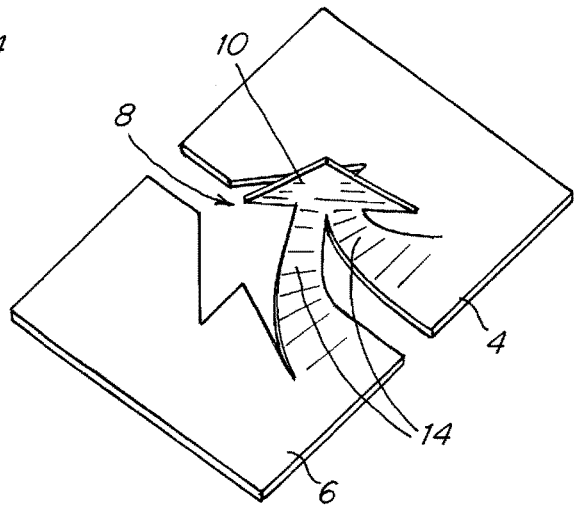
FIG. 12B is a schematic representation of the deployable fastening element depicted in FIG. 12A in the deployed state.

In another embodiment, and as depicted in FIGS. 12A and 12B, a deployable fastening element 8 may be located perpendicular to a deployment direction of a substrate including a first portion 4 and a second portion 6. The fastening element 8 may include two or more separate stems 14 that are also oriented perpendicular to the deployment direction and attached to the opposing first and second substrate portions 4 and 6. This embodiment does not include a separate deployment link. A fastening portion 10 is attached to the separate stems 14. As illustrated by FIG. 12B, as the first and second substrate portions 4 and 6 are displaced away from each other, the separate stems 14 are also drawn away from each other. Without wishing to be bound by theory, as the stems 14 are drawn apart, an out of plane moment is applied to the fastening element which moves it into the upright deployed state as depicted in FIG. 12B. The applied moment may also result in the fastening portion 10 twisting as it is deployed. While the fastening element 8 may be deployed by moving the opposing substrate portions 4 and 6 away from each other, the fastening element 8 may also be deployed by moving the substrate portions in opposite parallel directions along their interface. In this case, one of the stems 14 might function as a deployment link similar to the embodiments described above.

Figure 13A:
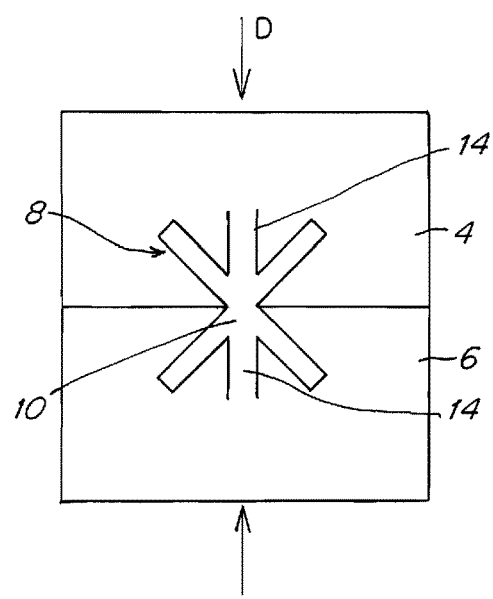
FIG. 13A is a schematic representation of a deployable fastening element that is deployed by displacing opposing substrate portions towards each other.
Figure 13B:
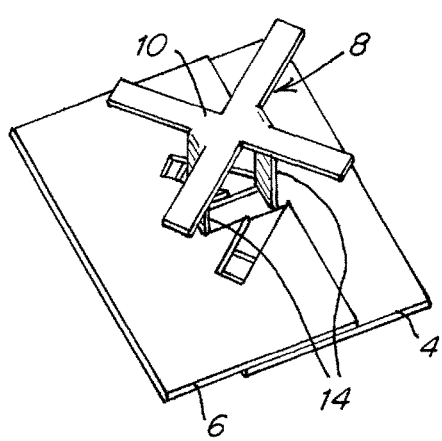
FIG. 13B is a schematic representation of the deployable fastening element depicted in FIG. 13A in the deployed state.

In the above embodiments, separate substrate portions 4 and 6 have been displaced away from each other in opposing directions in order to deploy a fastening element. However, as illustrated by FIG. 13A, a fastening element may be deployed by moving a first substrate portion 4 and a second substrate portion 6 towards each other. In the depicted embodiment, the fastening element 8 may include two opposing stem 14 located within and attached to the first substrate portion 4 and the second substrate portion 6. A fastening portion 10 may extend between the two opposing stems 14. Additionally, the fastening portion 10 may be shaped to provide a loop or an appropriate head to function as a fastening element. As depicted in the figure, the fastening portion 10 may be shaped like an X to function as a male fastening element. When the first and second substrate portions 4 and 6 are displaced towards one another, the stems 14 remain the same length and are thus displaced upwards during the noted displacement in order to accommodate their length. This upwards displacement of the stems 14 moves the fastening element 8 into the deployed state as shown in FIG. 13B. depending on the particular embodiment, the first and second substrate portions may either be displaced such that one slides above or underneath the other or the substrate portions may simply be plastically deformed as the disclosure is not so limited.

Figure 14A:
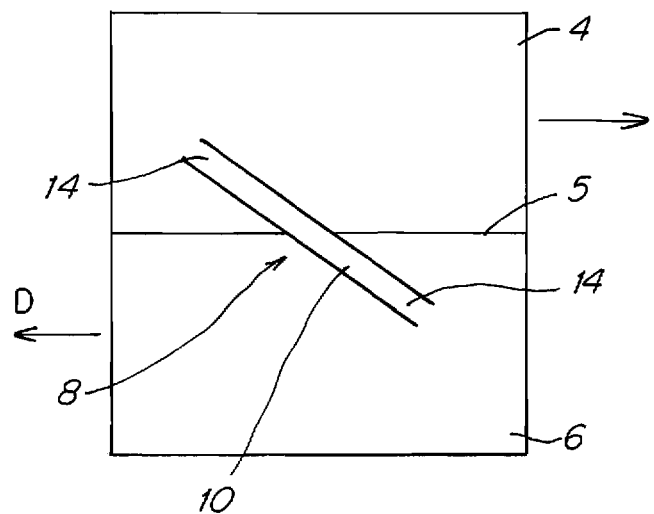
FIG. 14A is a schematic representation of a deployable fastening element that is deployed by displacing opposing substrate portions along an interface between the two portions.
Figure 14B:
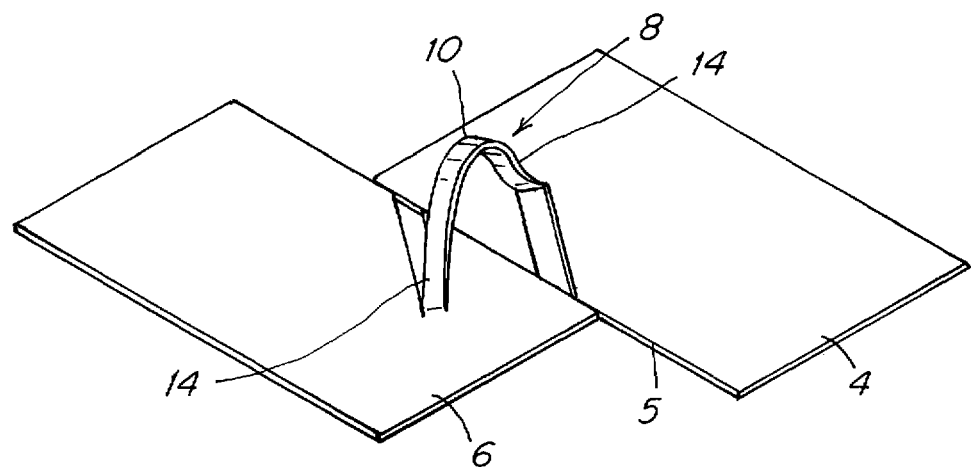
FIG. 14B is a schematic representation of the deployable fastening element depicted in FIG. 14A in the deployed state.

FIGS. 14A and 14B depict an embodiment of a deployable touch fastener that is deployed by displacing (e.g., sliding) a first substrate portion 4 and a second substrate portion 6 along their interface 5. In this embodiment, a deployable fastening element 8 may include two separate stems 14 located within the first and second substrate portions 4 and 6 and a fastening portion 10 extending therebetween. As illustrated by the figures, the fastening element 8 may be angled relative to the interface 5 located between the two opposing substrate portions. When the two opposing substrate portions 4 and 6 are displaced along their interface, and in a direction opposing the angled direction of the fastening element 8, the two stems 14 may be moved towards one another. Again, since the fastening portion 10 remains the same length, it is displaced upwards into the deployed state to accommodate its length as the two separate stems 14 are moved towards one another, see FIG. 14B. In this particular embodiment, the fastening portion 10 is a simple straight portion which forms a loop when positioned in the deployed state. However, embodiments in which different shapes of the fastening portion are provided to form different types of fasteners are also contemplated.

Figure 15:
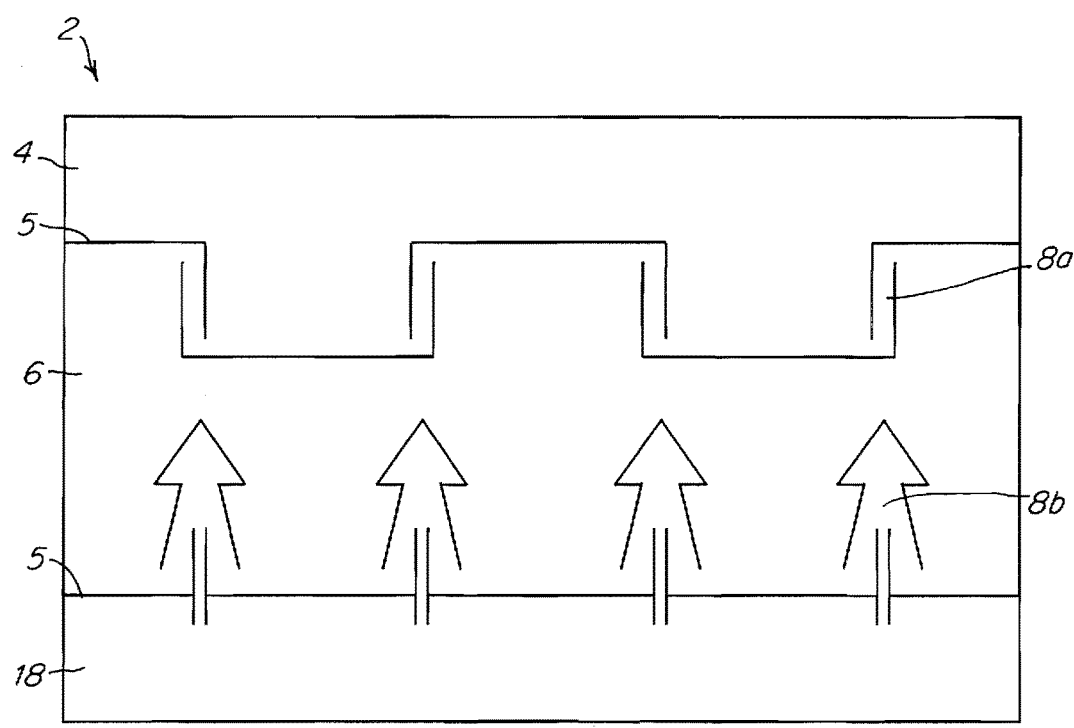
FIG. 15 is a schematic representation of a substrate including separate portions including male fastening elements and female fastening elements.

FIG. 15 depicts an embodiment of a substrate 2 including multiple types of fastening elements. As illustrated in the figure, the substrate may include at least a first portion 4 and a second portion 6. One or more female fastening elements 8a may be formed within the first portion 4 and one or more corresponding male fastening elements 8b may be formed within the second portion 6. However, embodiments in which different types of female and/or different types of male fastening elements are used on the same substrate are also contemplated. The various fastening elements 8a and 8b may either deploy on the same side of a touch fastener, or they may deploy on opposing sides of the touch fastener. In embodiments where the fastening elements deploy on the same side of the touch fastener, the resulting deployable touch fastener may be attached to itself in a face to face manner. In embodiments where the fastening elements deploy on opposing sides of the touch fastener, the resulting deployable touch fastener may be attached to itself in a face to back manner. While particular types of deployable fastening elements are depicted in the figures, any appropriate deployable fastening element might be used. Additionally, only a single row of each type of fastening element has been depicted in the figure for the sake of clarity. Therefore, it should be understood that any number of arrangements of the female and male fastening elements may be used and each type of fastening element may extend over any desired length of a deployable touch fastener as the disclosure is not so limited.

In addition to the use of different types of fastening elements within a single substrate, FIG. 15 illustrates that an interface 5 located between two adjacent substrate portions may have a different type of shape depending on the particular embodiment. For example, the interface 5 associated with the female fastening elements 8a has an edge that follows a somewhat castellated profile. In contrast, the interface 5 associated with the male fastening elements 8b has an edge with a substantially straight profile. However, an interface located between two adjacent substrate portions may follow any desired profile as the disclosure is not so limited. For example, an interface between two adjacent substrate portions may have a profile with a shape such as a sawtooth shape, a curve, an L shape, a wave shape, or any other appropriate shape.

Figure 16A:
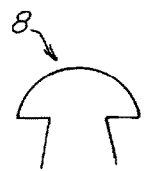
FIGS. 16A-16O are schematic representations of various shapes for a deployable fastening element.
Figure 16B:
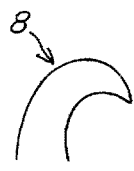
Figure 16C:
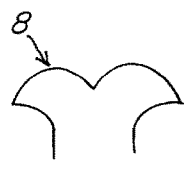
Figure 16D:
Figure 16E:
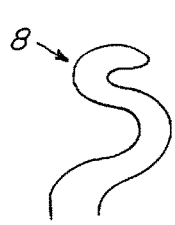
Figure 16F:
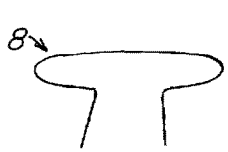
Figure 16G:
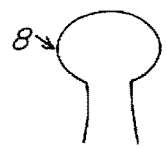
Figure 16H:
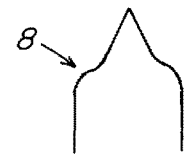
Figure 16I:
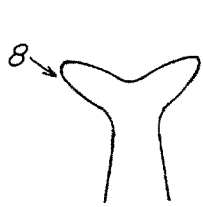
Figure 16J:
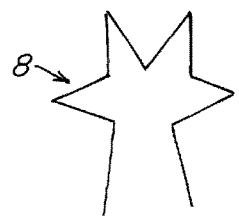
Figure 16K:
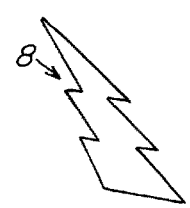
Figure 16L:
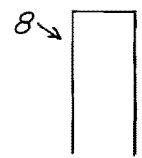
Figure 16M:
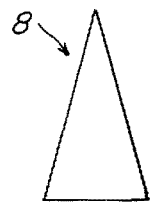
Figure 16N:
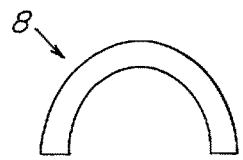

In many low cost, high volume applications a loop portion of a touch fastener may be designed with a very low profile loop to reduce material consumption and produce a low profile fastener. However, these low loops may be difficult to engage or snare with a mating hook or mushroom fastener since the tip of a typical hook or mushroom element may be unable to slide under an adjacent loop in order to engage it. Consequently, in some embodiments, a fastening element may include a fastening portion with a geometry selected to facilitate engagement with a mating portion of a touch fastener. FIGS. 16A-16N depict several non-limiting embodiments of fastening portion geometries that might be used. These possible geometries include shapes for a male fastening element such as an arrowhead shape (FIGS. 1A-7), a mushroom shape (FIG. 16A), a single hook shape (FIG. 16B), a double hook shape (FIG. 16C), a single or double sided saw tooth shape (FIG. 16D), a sinusoidal shape (FIG. 16E), a T-shape (FIG. 16F), a partial circle (FIG. 16G), a pointed shape (FIG. 16H), a Y-shape (FIG. 16I), a star burst shape (FIG. 16J), a lightning bolt shape (FIG. 16K), and/or any other appropriate shape. In some embodiments a fastening portion of a fastening element may be bent over in the deployed state or otherwise formed to facilitate engagement with a corresponding fastening element. Formation may either be done during deployment or it may be done using a post formation procedure. In either case, a fastening portion in such an embodiment may have a shape corresponding to a straight pin (FIG. 16L), a pointed or tapered pin (FIG. 16M), or other appropriate shape including those previously described above. In other embodiments, the fastening element might correspond to a female portion of a touch fastener with a shape such as a loop, multiple loops, or any other appropriate geometry, see FIG. 16N.

Figure 16O:
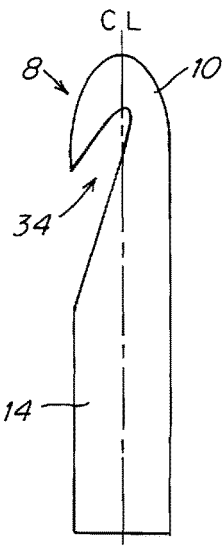

Without wishing to be bound by theory, deployable touch fasteners formed from a relatively thin substrate material results in a corresponding relatively thin fastening element when deployed. Such a fastening element may be subject to buckling, twisting, and/or shearing during deployment and/or use. Therefore, in some embodiments, it is desirable to provide a fastening element shape that may reduce and/or eliminate some of the above noted issues. One possible embodiment is depicted in FIG. 16O which depicts a fastening element 8 including a stem 14 with a rounded end, though another end shape might also be used. The fastening element 8 includes a throat 34 formed at an angle relative to a centerline CL of the fastening element. The throat 34 is also directed inwards and away from a base of the stem 14 to form a fastening portion 10. As illustrated in the figure, the fastening portion 10 is shaped similarly to a crochet hook. In some embodiments, the throat is constructed and arranged such that it extends up to, and in some embodiments beyond the centerline CL of the fastening element. Without wishing to be bound by theory, a loop engaged with the fastening portion 10 depicted in the figure will be located at or near the centerline CL of the fastening element. Consequently, a torque applied by a loop on the fastening element is reduced as compared to loops held on arms or other structures located at a distance from the center line of the fastener. This may again help to reduce, and/or eliminate, buckling, twisting, and/or shearing of the fastening elements due to the corresponding lower torques applied to the fastening elements. While a fastening element capable of reducing and/or eliminating buckling, twisting, and/or shearing during deployment and use is described above, embodiments in which buckling, twisting, and/or shearing of the fastening element is desirable are also contemplated.

In some embodiments, it may be desirable to include one or more features that may function as deployment stops to limit the relative displacement of adjacent portions of a substrate. These deployment stops may permit the angle, or degree of, fastener element deployment to be controlled. The deployment stops may also help to prevent over deployment of the fastening elements due to the application of an excessive deployment force and/or displacment to the substrate portions during deployment or use. Several non-limiting embodiments of deployment stops are depicted in FIGS. 17A-17C.

Figure 17A:
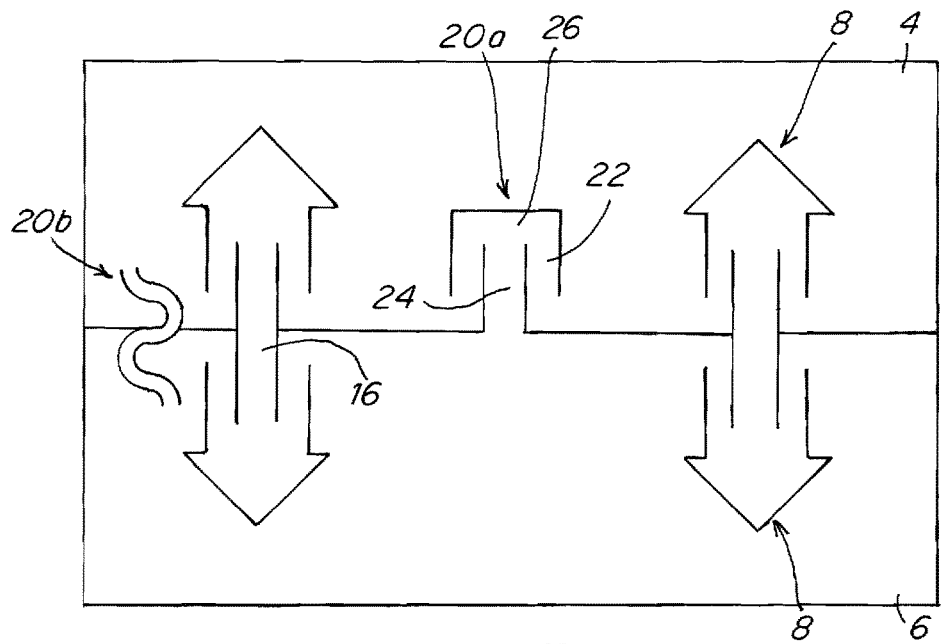
FIG. 17A is a schematic representation of a plurality of deployable fastening elements and two different deployment stops, all shown in an undeployed state.
Figure 17B:
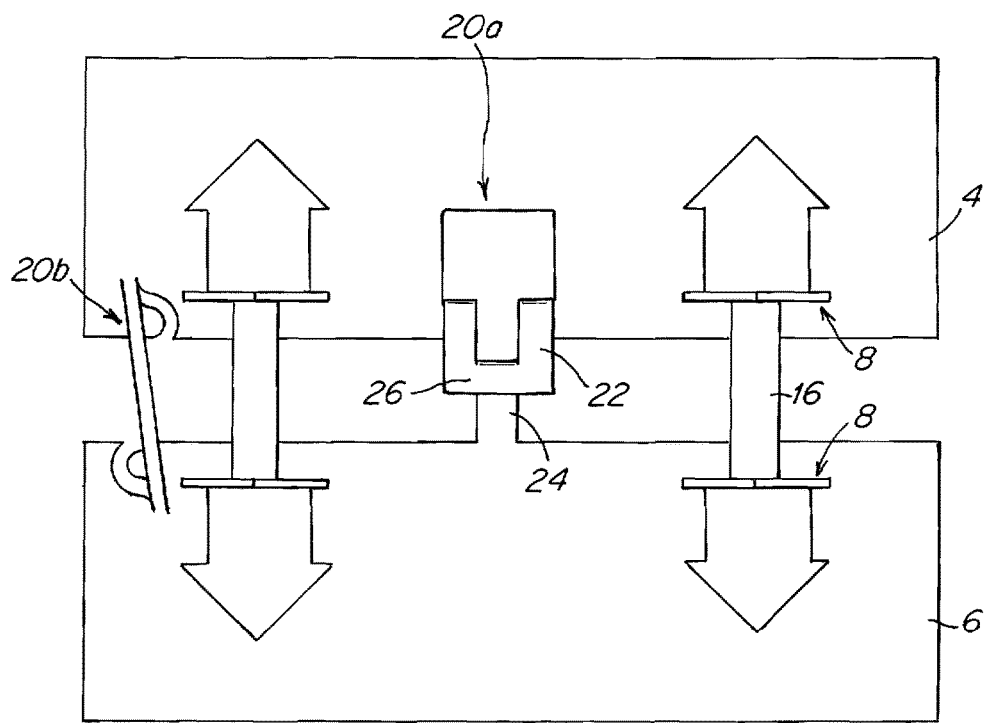
FIG. 17B is a schematic representation of the plurality of deployable fastening elements and the deployment stops of FIG. 17A in a deployed state.
Figure 17C:
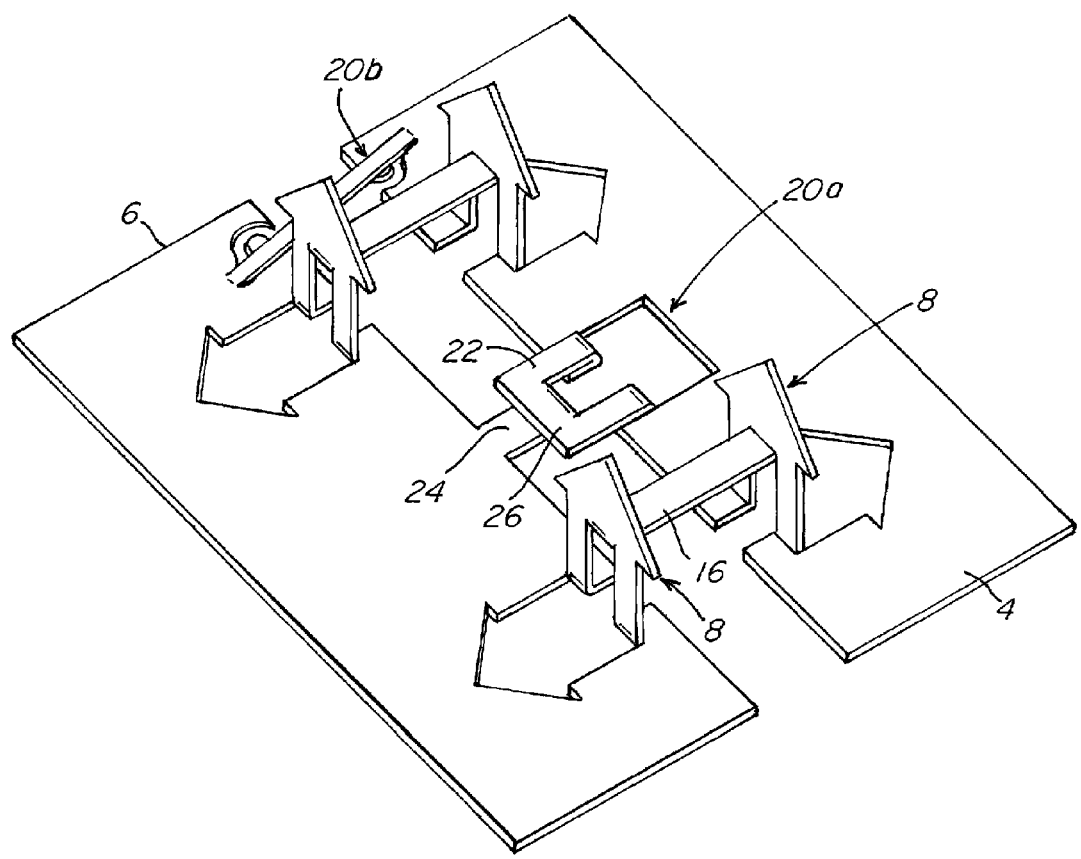
FIG. 17C is a schematic perspective view of the plurality of deployable fastening element and the deployment stops of FIG. 17A in a deployed state.

As depicted in FIGS. 17A-17C, a first portion of the substrate may include deployment stop 20a including a one or more legs 22 associated with a deployment link 24 extending between, and attached to, the deployment stop and the second portion 6 of the substrate. In the specific embodiment shown in the figures, the deployment stop includes two legs 22 extending from opposing ends of a back span 26 and the deployment link 24 is attached to a central portion of the back span 26. The lengths of the deployment stop 20a and the associated deployment link 24 are selected to control the amount of deployment of the associated fastening elements formed on the first and second portions 4 and 6 of the substrate. More specifically, as the deployment stop 20a is extended, the stem 22 and back span 26 are deformed up and over until they overlap with the deployment link 24 and are positioned in the fully extended position. Once fully extended, the deployment stop 20a may substantially prevent further displacement of the adjacent portions of the substrate until sufficient force is applied to either deform or fracture the deployment stop. In some embodiments, the deployment stops may be engineered to undergo permanent deformation during deployment to maintain the deployable touch fastener in the deployed position.

In another embodiment, a deployment stop 20b may extend between a first portion 4 and a second portion 6 of a substrate. As depicted in FIGS. 17A-17C the deployment stop 20b may correspond to a nonlinear shape such as an S shape, a curve, a sinusoidal wave shape, a saw tooth shape, or any other appropriate shape where a total length of the shape in the undeployed state is greater than a distance between the two attachment points to the first and second portions 4 and 6. As the first and second portions 4 and 6 are displaced relative to one another, the deployment stop 20b may become elongated and assume a somewhat straightened shape between the attachment points to the first and second portions 4 and 6. As the deployment stop 20b goes from the initial undeployed state to the straightened deployed shape, it may apply an increasing force to oppose the displacement of the first and second portions and thus may function as a deployment stop for a deployable touch fastener.

FIGS. 17A-17C also depict another embodiment of two opposing deployable fastening elements 8. More specifically, as depicted in the figures, a deployable touch fastener may include one or more deployment links 16 extending between, and attached to, two opposing fastening elements 8 formed on the first portion 4 and the second portion 6. During deployment of the fastening elements 8, the deployment links 16 apply deployment forces to both fastening elements 8 located on the opposing first and second portions 4 and 6 of the substrate. Therefore as the first and second portions are displaced relative to each other, the fastening elements 8 are moved towards their deployed position. In some embodiments, a stiffness of the deployment link relative to the fastening elements 8 may be selected such that the opposing fastening elements may provide some resistance to additional displacement of the substrate portions after they are fully deployed. However, if additional force is applied, over bending of the fastening elements may still result.

Figure 18A:
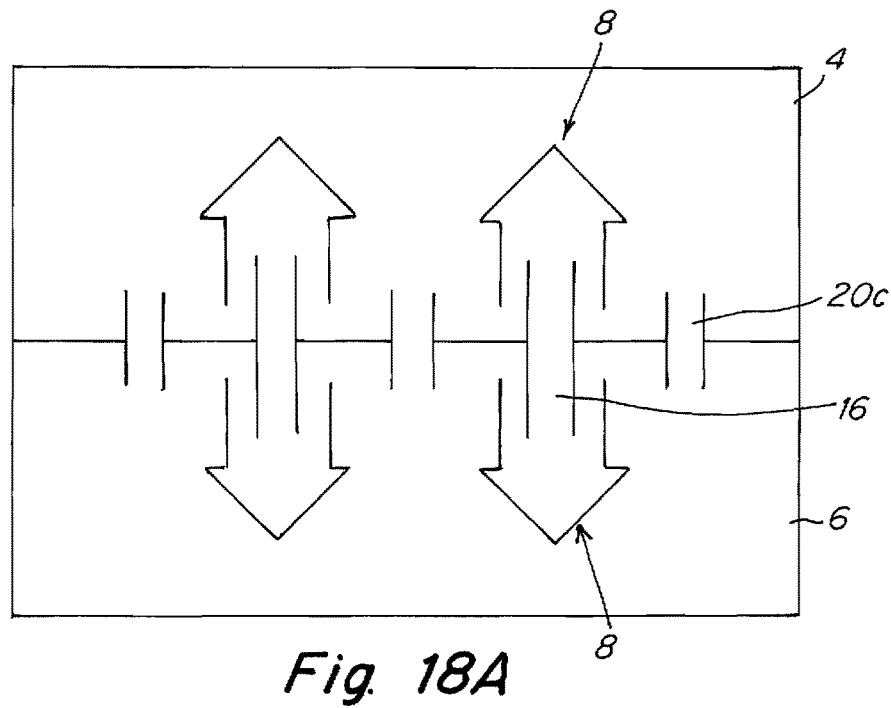
FIG. 18A is a schematic representation of a plurality of deployable fastening elements and a plurality of deployment stops.
Figure 18B:
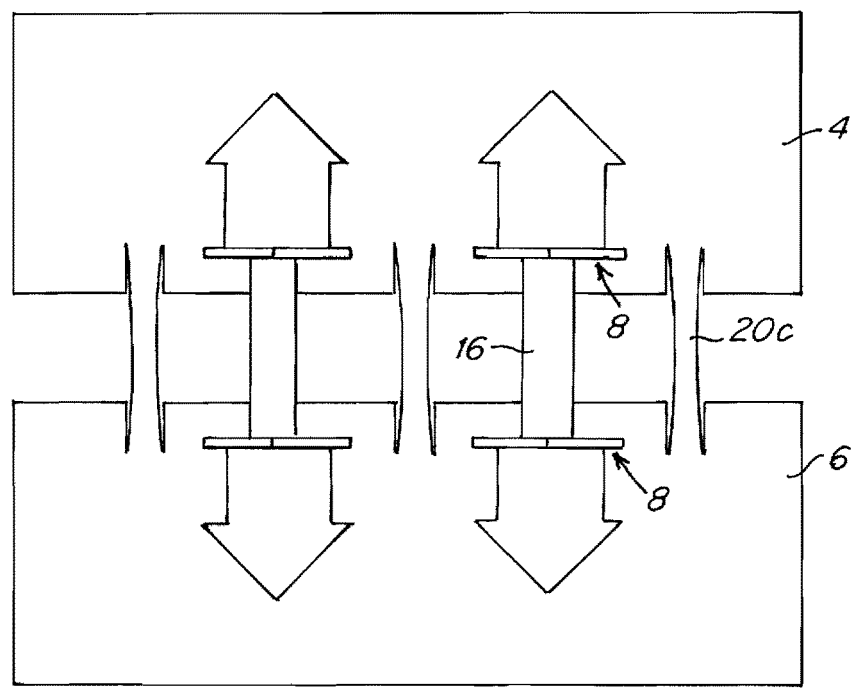
FIG. 18B is a schematic representation of the plurality of deployable fastening elements and the plurality of deployment stops of FIG. 18A in a deployed state

FIGS. 18A and 18B depict another embodiment of a deployment stop 20c. In the depicted embodiment, one or more deployment stops 20c may correspond to a straight link extending between and attached to both the first portion 4 and the second portion 6 of a substrate. As the first and second portions 4 and 6 are displaced relative to one another, the one or more deployment stops 20c may be stretched from a first undeployed length to a second length greater than the first. As the deployment stops 20c are stretched, they may exhibit an increasing resistance to further displacement of the first and second portions relative to each other. Thus, the deployment stops 20c may function appropriately to limit deployment of a deployable touch fastener Depending on the particular embodiment, the deployment stops 20c may be engineered to stretch predictably to a preferred length while remaining intact. Additionally, in certain polymers and under certain conditions, stretching of the deployment stops 20c, may result in molecular orientation of the substrate material within the deployment stop 20c causing the force required to stretch the deployment stop to increase until it reaches a desired peak.

Depending on the particular embodiment, the deployment links and/or deployment stops described above may either be broken during deployment of a deployable touch fastener or they may remain intact as the disclosure is not so limited. However, in instances where the deployment links and/or deployment stops are broken during deployment, it may be desirable to include an underlying material layer such as a laminate to support the now deployed touch fastener.

While several embodiments of a deployment stop have been depicted in the figures and described above, it should be understood that a deployment stop for limiting, and/or substantially preventing, over deployment of one or more fastening elements may be provided in any number of different ways. Therefore, the concept of a deployment stop should not be limited to only those embodiments with which it is described and instead may be applied to any embodiments disclosed herein or otherwise.

Another arrangement for deploying one or more fastening elements in response to deformation of a continuous substrate is illustrated in FIGS. 19A-20C. As described in more detail below, this deployment arrangement may not require separate deployment links or substrate portions. Instead, the profiles of the fastening elements may be cut into the substrate and these cuts may serve as intermittent breaks in the substrate, allowing the substrate to be stretched without additional cross-cuts similar to the deployable fastening element described above regarding FIGS. 5A and 5B. More specifically, the intermittent breaks in the substrate may create a distortion of the substrate during deformation of the substrate which may be used to cause the fastening elements to deploy above and/or below the resultant, somewhat undulating, surface of the substrate. By implementing variations in the shape, length, and locations of these cuts the product performance and appearance may be changed. The fastening elements may remain deployed after stretching, or they may return to their original state depending upon materials used and deployment forces.

In the depicted embodiment, a substrate 200 does not include discrete portions as described above. Instead, as depicted in the figures, the substrate 200 may be continuous and one or more lines 202 and 204 corresponding to cuts, gaps, or weakened portions of the substrate may define one or more fastening elements. In this particular embodiment, even though the substrate is continuous, a first portion of the substrate located on one side of the one or more fastening elements is displaced relative to a second portion of the substrate. Without wishing to be bound by theory, this results in a continuous deformation of the substrate between these two portions which may be used to deploy a fastening element as described herein. For example, two opposing ends of a substrate may be displaced relative to one another in order to provide a desired deformation to deploy one or more fastening elements located between the ends. In instances where the lines 202 and 204 form symmetric interlocking shapes, fastening elements 202a, 202b, 204a, and 204b may be formed which face in opposing directions. These fastening elements may then be deformed out of plane to form multiple interlocking fastening elements such as those depicted in the figures. Since these fastening elements face in opposite directions, this may help with engaging a mating portion of a touch fastener. However, as depicted in FIG. 19D, shapes for forming non-symmetric fastening elements such as single fastening elements 202a and 204a without the presence of opposing fastening elements may also be used. Without wishing to be bound by theory, the symmetrical elements may allow for tighter nesting of elements and engagement in either direction. In contrast, the non-symmetrical elements may allow the fastening element to be more receptive to engagement with mating fasteners by providing more open space immediately adjacent to the element. Additionally, the fastening elements depicted in FIG. 19D are oriented in the same direction and may permit the use of the touch fastener in a manner similar to a ratchet. Namely, the fastening elements 202a and 204a will engage a corresponding object or surface when pulled in a first direction, but will release the corresponding object or surface when pulled in a second opposing direction. Therefore, the touch fastener of FIG. 19D could be used in a strap or other configuration where it may be subjected to repeated tighten, release, and attach cycles by simply pulling on the touch fastener in a release direction followed by pulling on the touch fastener in a tightening direction.

Figure 19A:
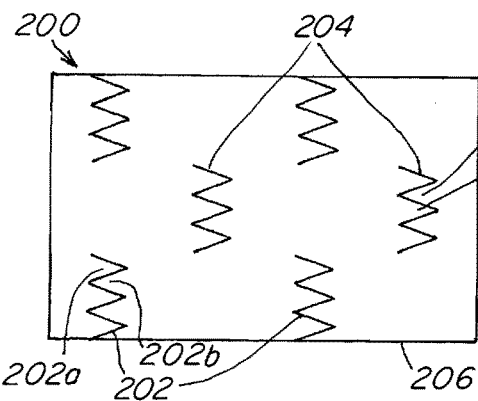
FIG. 19A is a schematic representation of a deployable touch fastener with fastening elements that are deployed by deforming an integral substrate where different rows of fastening elements are staggered across an entire width of the deployable touch fastener.
Figure 19B:
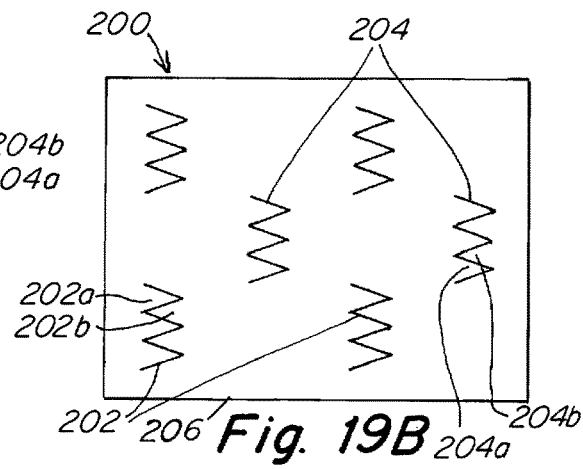
FIG. 19B is a schematic representation of a deployable touch fastener with fastening elements that are deployed by deforming an integral substrate where the fastening elements are positioned across a portion of the width of the deployable touch fastener.

As illustrated by FIGS. 19A and 19B, the pattern formed on the substrate 200 may either extend to the edges 206 of the substrate, or it may leave an uninterrupted portion of the substrate running along both edges 206 as the disclosure is not so limited. These uninterrupted edge portions may help facilitate additional post processing of the deployable touch fastener by providing a more manageable edge that is easier to manipulate. Additionally, an uninterrupted edge portion may provide more uniform deployment for the fastening elements closest to the edge of the strip.

Figure 19C:
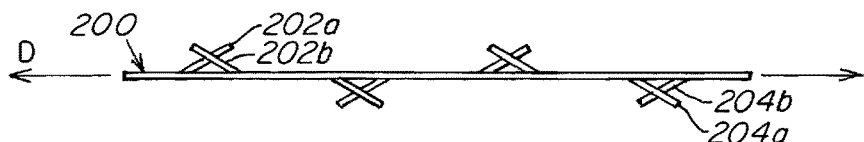
FIG. 19C is a schematic side view of the deployable touch fastener of FIG. 19A in the deployed state.
Figure 19D:
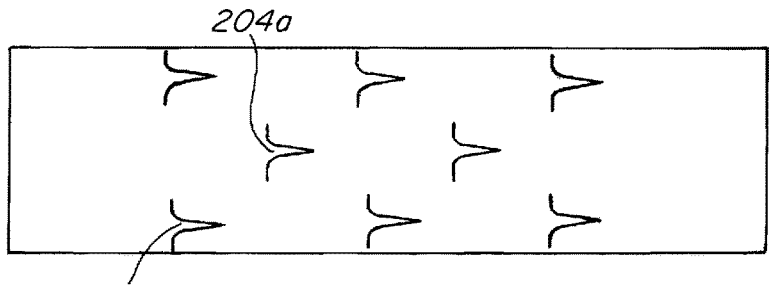
FIG. 19D is a schematic representation of a touch fastener including single fastening elements that are deployed when an integral substrate is deformed.
Figure 19E:
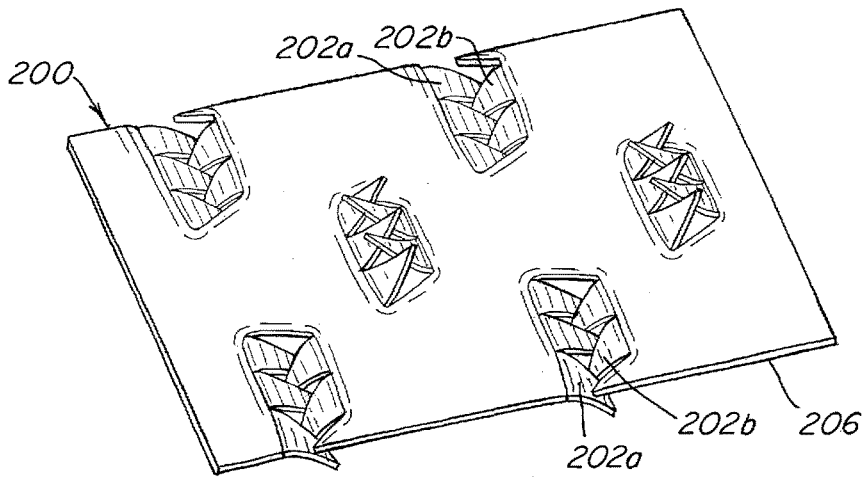
FIG. 19E is a schematic representation of a deployable touch fastener similar to FIG. 19A in the deployed state.

The patterns shown in FIGS. 19A-19E correspond to an embodiment where a pattern indicated by lines 202 and 204 intermittently shifts or alternates as it repeats along a deployment direction of the substrate, for example, a machine direction of the substrate. Without wishing to be bound by theory, the alternating pattern formed by lines 202 and 204 could create a non-uniform stress and strain field within the substrate 200 when it is deformed. Depending on the particular layout, this non-uniform stress and strain field may result in the fastening elements 202a and 202b deploying on a side of the substrate and the fastening elements 204a and 204b deploying on the opposite side of the substrate as illustrated in FIGS. 19C and 19E. However, it should be appreciated that aspects of the disclosure are not limited in this regard, and instead the alternating pattern formed by lines 202 and 204 could also result in the fastening elements 202a and 202b and the fastening elements 204a and 204b deploying on the same side of the substrate.

Figure 20A:
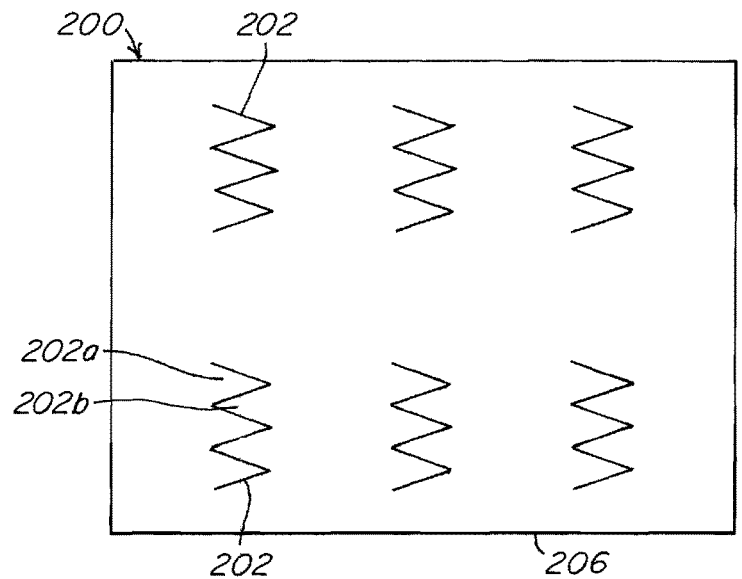
FIG. 20A is a schematic representation of a deployable touch fastener with fastening elements arranged in aligned rows and columns.
Figure 20B:
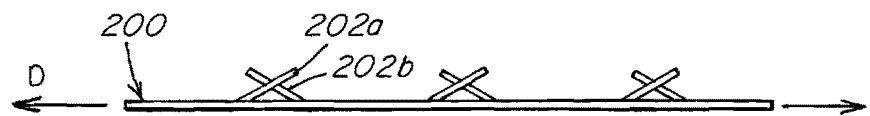
FIG. 20B is a schematic representation of the deployable touch fastener of FIG. 20A in the deployed state.
Figure 20C:
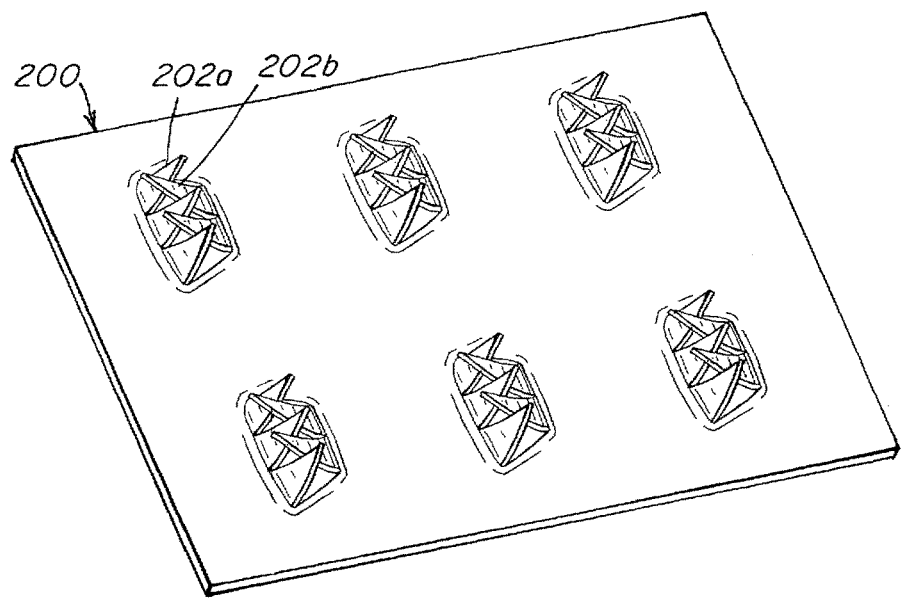
FIG. 20C is a schematic representation of a deployable touch fastener similar to FIG. 20A.

In another embodiment as shown in FIGS. 20A-20C, a pattern in a substrate 200 may be defined by lines 202 located at constant width locations of the substrate and repeat along a length of the substrate. Depending on the embodiment, the lines may repeat with a constant pitch or the pitch may be variable along the length of the substrate as the disclosure is not so limited. As illustrated by the figures, this pattern of lines 202 may provide a series of uninterrupted strips running along a length of the substrate between the rows of fastening elements 202a and 202b defined by the lines 202. These uninterrupted strips may act to prevent breaking of the substrate and may also limited distortion of the substrate during deployment. Additionally, since the pattern and locations of lines 202 is constant along the length of the substrate 200, the stress and strain fields applied to the individual fastening elements 202a and 202b may be similar along the length of the substrate. Consequently, it is possible that the fastening elements may deploy on the same side of the substrate as depicted in FIGS. 20B and 20C. However, it should be appreciated that aspects of the disclosure are not limited in this regard, and instead the pattern and locations of lines 202 could also result in the fastening elements 202a and 202b deploying on opposite sides of the substrate.

Accordingly, though different patterns and locations of lines 202 are shown and described with respect to FIGS. 19A-19E and FIGS. 20A-20C as being possible configurations that may cause the fastening elements to deploy in a certain direction or directions, it should be appreciated that other physical mechanisms may be employed to urge fastening element deployment in a desired direction or directions, as will be discussed further below.

Figure 21A:
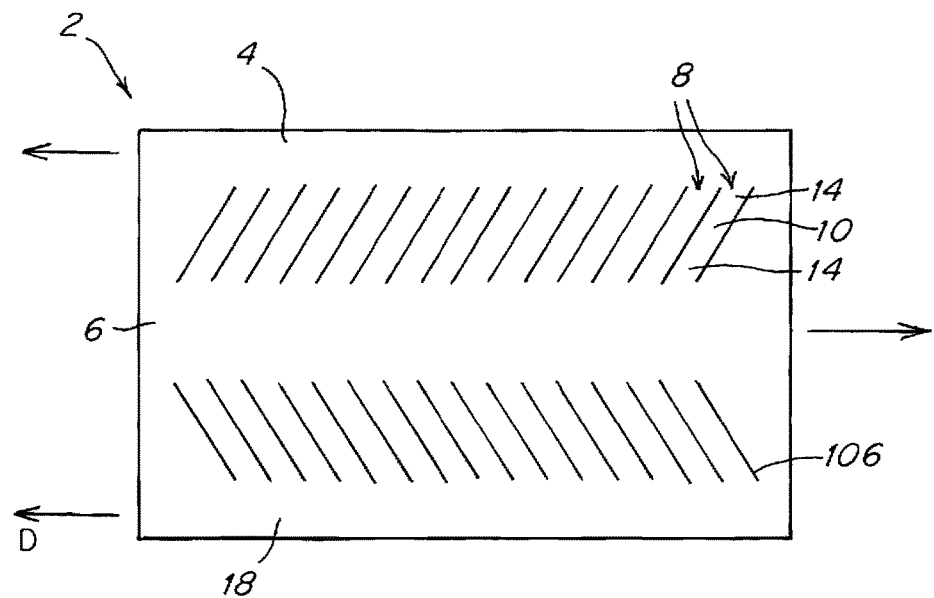
FIG. 21A is a schematic representation of a deployable touch fastener including integrally formed portions that are deformed relative to one another to deploy one or more fastening elements.
Figure 21B:
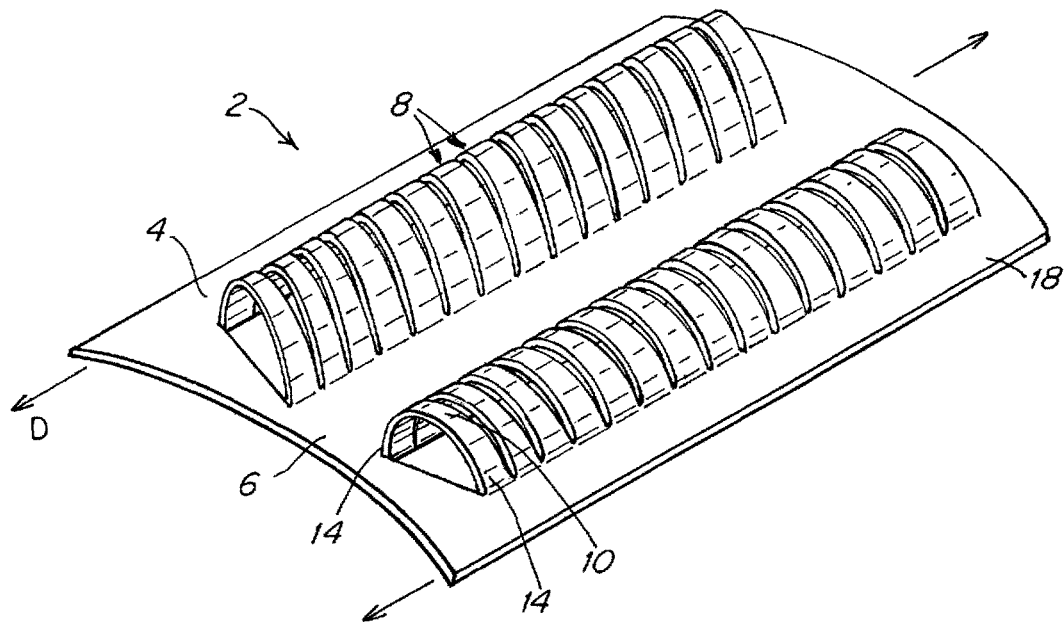
FIG. 21B is a schematic representation of the deployable touch fastener of FIG. 21A in the deployed state.

In another embodiment shown in FIGS. 21A and 21B, including a continuous substrate, a continuous substrate 2 may include a series of fastening elements 8 defined by two or more substantially parallel lines 106 angled relative to a deployment direction of the substrate. The fastening elements 8 defined between the lines 106 may include two stems 14 located on opposing ends of the fastening elements and a fastening portion 10 located between the two opposing stems. In the depicted embodiment, two sets of fastening elements are located between the uncut continuous portions 4, 6, and 18 of a substrate. Therefore, when the adjacent portions of the substrate are moved in directions opposing the angled direction of the lines 106, the opposing stems 14 of the fastening elements are moved towards one another. Somewhat similar to the embodiment described above regarding FIGS. 14A and 14B, since a length of the fastening elements does not change, the fastening portions 10 may be displaced out of plane to form loops in order to accommodate the length of the fastening elements as their ends are positioned closer to one another as depicted in FIG. 21B. While the depicted embodiment included two sets of fastening elements and a central substrate portion, embodiments including a single set of fastening elements or any number of sets of fastening elements are also contemplated.

Figure 22A:
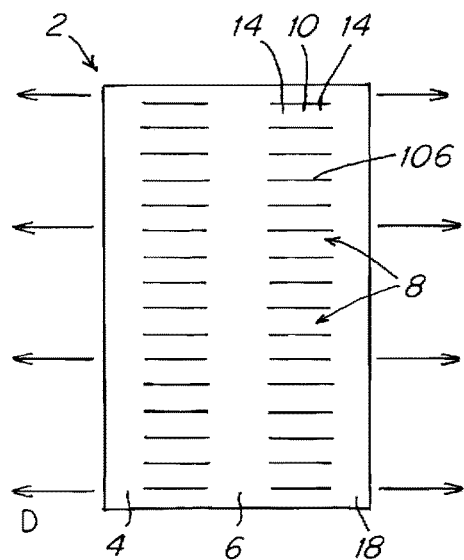
FIG. 22A is a schematic representation of a deployable touch fastener that includes multiple slits to form fastening elements that are deformed prior to displacing portions of the substrate towards one another to form loops.
Figure 22B:
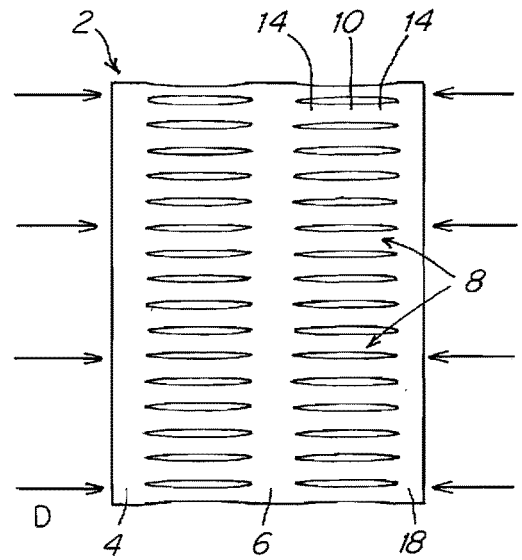
FIG. 22B is a schematic representation of the deployable touch fastener of FIG. 22A after deforming the fastening elements and prior to displacing the portions towards one another.
Figure 22C:
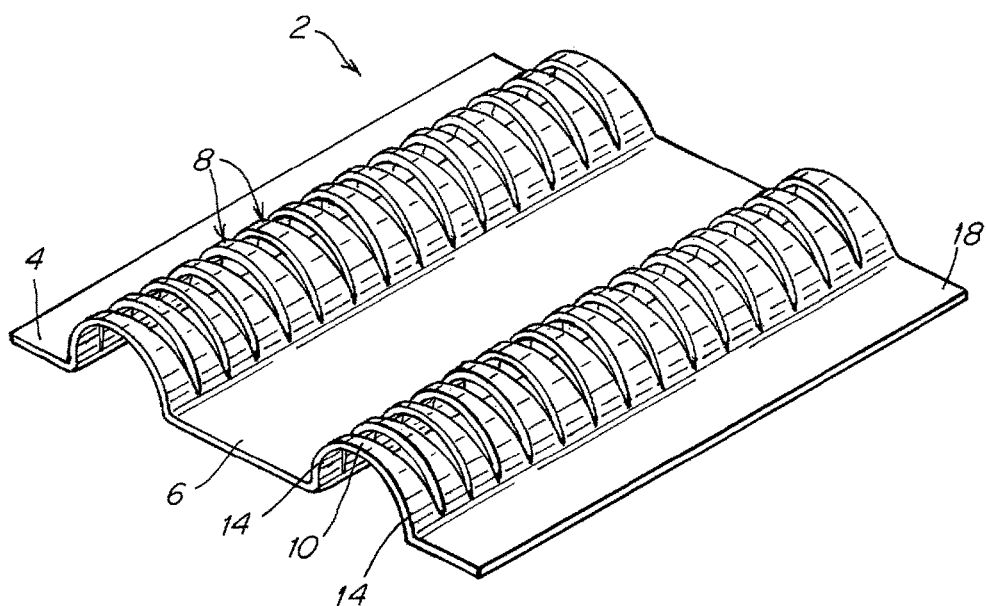
FIG. 22C is a schematic representation of the deployable touch fastener of FIG. 22B after displacing the portions towards one another to form loops.

In a somewhat similar embodiment, as shown in FIGS. 22A and 22B, a continuous substrate 2 may include a series of fastening elements 8 defined by two or more substantially parallel lines 106 that are substantially parallel to a deployment direction of the substrate. The fastening elements 8 defined between the lines 106 may again include two stems 14 located on opposing ends of the fastening elements and a fastening portion 10 located between the two opposing stems. In the depicted embodiment, two sets of fastening elements are depicted as being located between the uncut continuous portions 4, 6, and 18 of the substrate. However, in this embodiment, the substrate is first deformed by uniformly stretching the substrate in a first direction. As depicted in FIG. 22B, this results in the fastening elements 8 being stretched as well. As the fastening elements 8 are stretched they may become elongated and thinned relative to their original configuration. Additionally, when appropriate polymeric materials and dimensions are used, molecular orientation of the material within the fastening elements may occur providing increased strength and elongation of the resulting fastening elements. After stretching the substrate 2 in a first direction, the substrate may then be displaced in a second direction opposite the first as depicted in FIG. 22B. As the opposing stems 14 located at the ends of each fastening element 8 are moved towards one another, the fastening portions 10 may again be displaced out of plane to form loops in order to accommodate the length of the fastening elements as depicted in FIG. 22C.

Figure 23:
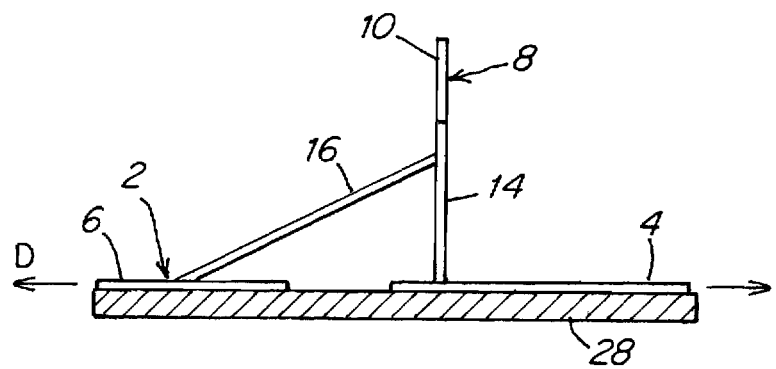
FIG. 23 is a schematic representation of a deployable touch fastener including an underlying layer.

In some embodiments, a deployable touch fastener may be attached to, or embedded within, another material layer. This material layer may either be applied to a portion, or the entire surface of a deployable touch fastener. For example, as depicted in FIG. 23, a substrate 2 of a deployable touch fastener may be attached to an underlying material layer 28 along its entire length. As noted above, the material layers and any associated adhesives may be applied to either a portion, or the entire, surface of the deployable touch fastener. However, one of the more common problems associated with typical touch fasteners is the difficulty associated with bonding the fastener strip to another material layer. More specifically, nylon, polypropylene, and other polymers typically used to manufacture touch fasteners tend to be resistive to many adhesives. Modifications such as holes, laminates, and other modifications may be made to the substrate of a touch fastener to facilitate mechanical bonding of the material layer with the touch fastener. In view of the above, the gaps, and holes present within a deployable touch fastener after deploying the fastening elements may serve to enhance the bonding of the deployable touch fastener substrate to various other material layers. In some instances, the bond may correspond to either fully or partially encapsulating the touch fastener substrate to provide a mechanical bond in addition to any chemical bond achieved. It should be understood that the associated material layer may correspond to any appropriate material and it may be shaped in any appropriate fashion. For example, a material layer might be flat, corrugated, V-shaped, pleated, and/or foamed. Additionally, the material layer may be located on either side of a deployable touch fastener.

As noted above, an attached material layer may correspond to any number of different materials. For example, the material layer may correspond to an elastic material such as an elastomeric film, coating, and/or non-woven material. The material might also correspond to a structural material intended to provide strength to the resulting composite structure and/or to maintain the fastener in a desired deployment state. Other materials may also be used to provide a deployable touch fastener that may be selectively deployed or undeployed. Specific non-limiting embodiments of composite structures with a deployable touch fastener are described in more detail below.

In some applications, such as when a deployable touch fastener is integrated with an automotive seat bun, the deployable touch fastener may be attached to an underlying foam layer while in the deployed state. In some embodiments, the foam layer may be foamed after being placed in contact with the deployable touch fastener. In such an embodiment, the foam may intrude into the gaps between separate portions of the touch fastener substrate which may increase the bond strength by providing enhanced mechanical bonding between the layers. However, embodiments in which the foam does not intrude between separate portions of the touch fastener substrate and/or where the foam is foamed prior to attachment to the deployable touch fastener are also possible. It should be understood that the foam may be correspond to materials such as polyurethane foam, Styrofoam, and any other appropriate material capable of being foamed and attached to the deployable touch fastener. While a deployable touch fastener has been described as being attached to a foam layer in the deployed state, embodiments in which a foam is attached to a deployable touch fastener in the undeployed state are also contemplated. Additionally, a deployable touch fastener might also be combined with manufacturing methods such as casting, injection molding, and other appropriate manufacturing methods in which the deployable touch fastener is integrated with a resulting part formed during the manufacturing process.

In embodiments where a deployable touch fastener might become fully or partially embedded within a material, as might happen with the foaming, casting, and injection molding methods noted above, it may be desirable to protect some or all of the fastening elements from being coated, encased in, or contaminated with these materials. Additionally, it may be desirable to protect the touch fastener from being damaged during manufacturing and installation. Protecting the substrate and fastening elements may be done in any number of ways. Two possible embodiments are described in more detail below.

Figure 25:
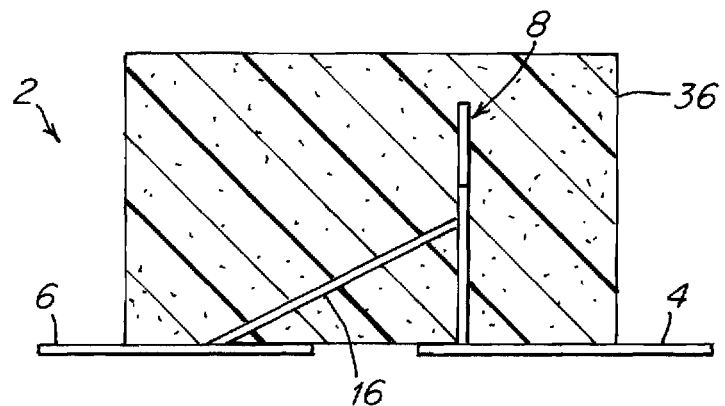
FIG. 25 is a schematic cross-sectional view of a deployable touch fastener in the deployed state with a protective material disposed on top of the fastening elements.

In one exemplary embodiment, fastening elements located in a deployed or undeployed state might be covered and/or encapsulated with a film or other protective material 36 to temporarily shield or protect the fastening elements. FIG. 25 presents one such configuration where a deployed fastening element 8 is positioned within a protective material 36. The protective material 36 may either cover an entire fastening element such that it contacts the substrate or it may only partially cover a fastening element from a tip of the fastening element to part way down a stem of the fastening element without contacting the substrate as the disclosure is not so limited. The protective material 36 may subsequently be removed when the protective material is no longer needed, leaving the fastening element 8 in the deployed position and ready for use. In the depicted embodiment, since the fastening element is located in the deployed position and covered by the protective material another underlying material layer to protect the fastening element is not needed. However, in embodiments where a fastening element is in the undeployed position, it may be desirable to provide an underlying material layer as noted above to prevent material from bonding directly to the fastening element and possibly preventing the subsequent deployment of the fastening element. Depending on the particular embodiment, ends of the substrate 4 are left uncovered by the protective material 36. This may permit the ends of the substrate 4 to be embedded in a material during either a foaming, molding, casting, or other appropriate manufacturing process. Embedding the ends of the touch fastener in the material may help to retain the touch fastener on a desired surface or object when loaded. Additionally, in some embodiments, the protective material may be coated with, or made from, a magnetic material. This may help with positioning of the touch fastener using a magnetic positioning system as is used in some automotive applications. For example, the protective material could be coated with a magnetically attractable metallic ink or coating. Alternatively, the protective material could be made from a plastic or elastomeric material doped with a magnetically attractable metallic material. Of course, other magnetically attractable materials could also be used as the disclosure is not so limited.

Figure 26:
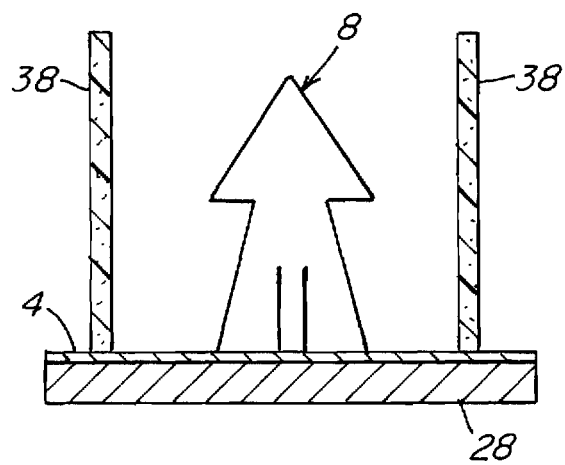
FIG. 26 is a schematic cross-sectional view of a deployable touch fastener in the deployed state with edge seals.

In another exemplary embodiment, a touch fastener includes one or more edge seals 38 extending from the surface of the substrate 4 up to a height equal to or greater than the fastening elements when located in the deployed state, see FIG. 26. Depending on the particular embodiment, the edge seals 38 may either be rigid or compliant. Without wishing to be bound by theory, a compliant edge seal may provide a better seal when pressed against an opposing surface. In either case, the edge seals 38 may be located on either side of the substrate and may extend along the entire length, or along a portion of the length, of the substrate 4 as the disclosure is not so limited. The edge seals 38 may be located at an edge of the substrate 4, or they may be offset from the edge as shown in the figure such that unsealed outer portion of the substrate extends along the length of the substrate. While the edge seals have been shown as being located on the edges extending along a length of the substrate, it should be understood that edge seals may also be located at the edges along the ends of the substrate 4 as well, not depicted. In embodiments where the substrate 4 is cut into discrete portions, it may be desirable to provide an underlying material layer 28 to seal a bottom surface of the deployable touch fastener and prevent material from penetrating through the gaps between the substrate portions. However, embodiments in which an underlying material layer is not used with an edge seal are also contemplated. For example, an edge seal might be used with a continuous substrate.

In one embodiment, a deployable touch fastener may either be fully, or partially, laminated along its length with an elastic material layer such as an elastomeric film or non-woven material bonded with the deployable touch fastener substrate. Such a composite material may provide enhanced retraction of the fastening elements upon release of the touch fastener substrate after deployment. If the elastic material layer is adhesively bonded to deployable fastener it may be advantageous to first deploy the touch fastener prior to applying adhesive to the structure to avoid bonding the fastening elements to the laminate. After appropriate curing, cooling, and/or drying of the adhesive, the deployable touch fastener may be released to allow the touch fastener to return to the retracted undeployed state. In some embodiments, the elastic material layer may be pre-stretched to a degree during the lamination process such that after bonding the fastening elements either partially, or fully, retract back into the touch fastener substrate plane when un-deployed. Thus, a deployable touch fastener may be adapted to repeatedly deploy and undeploy a plurality of fastening elements. As noted above, this may be useful in a number of applications including for example, in touch fasteners attached to garments, such as on coat sleeves and winter-wear, because when not in use the fastening elements may be positioned in the undeployed state reducing the chance of tangling or ensnaring portions of the garment or other garments. While deployable touch fasteners including a stretched elastic material layer applied to a deployed touch fastener are described above, embodiments in which an unstrained elastic material layer is applied to an undeployed touch fastener as well as other combinations are also contemplated.

In another embodiment, a deployable touch fastener may be laminated with a material layer that provides structural support after it has been deformed to the deployed state. In such an embodiment, the thickness and material strength of the material layer may be selected to substantially prevent retraction of the deployable touch fastener. Therefore, the underlying material layer may permanently maintain the deployable touch fastener in the deployed state.

In some instances it may be desirable to laminate a deployable touch fastener to a material layer including mating fastening elements or surfaces to permit attachment of the deployable touch fastener to itself in a face to back arrangement. For example, when a male fastening element is provided on a deployable touch fastener, the deployable touch fastener may be laminated to a material layer including corresponding loops. These loops may simply be a non-woven material or it may include engineered loops that are oriented and/or sized for engaging with the fastening elements of the deployable touch fastener. Alternatively, in some embodiments, the deployable touch fastener is laminated or otherwise bonded to a foam capable of attaching to the fastening elements. Embodiments including different types of mating fastening elements, surfaces, objects, and other materials are also contemplated.

In yet another embodiment, a material layer attached to a deployable touch fastener substrate may correspond to a material capable of changing its dimensions. For example the material layer may be selectively expanded or contracted using either heat, water absorption, a chemical reaction, or an applied voltage. For example, a ceramic or polymeric piezoelectric material capable of contracting and expanding in response to an applied voltage might be used. Alternatively, a material layer with a different coefficient of thermal expansion as compared to the deployable touch fastener substrate might be used to control expansion and contraction of the associated substrate in response to an applied temperature. In yet another embodiment, materials that undergo a physical transition in response to the application of a physical stimulus, such as heat, may be used to control expansion and/or contraction of the associated substrate. For example, a shrink film that contracts in response to being heated may be used as the underlying material layer. Such an embodiment may be useful where the touch fastener is deployed by deforming or displacing the substrate portions towards one another and/or to retract a substrate and corresponding touch fasteners in response to heat. With regards to the above embodiments, since the underlying material layer is attached to the deployable touch fastener substrate, selectively expanding and contracting this material layer may result in the substrate of the deployable touch fastener undergoing corresponding expansions and contractions which may be used to selectively deploy and undeploy fastening elements formed therein. Other ways of selectively deforming a substrate to provide a selectively deployable touch fastener are also contemplated.

In yet another embodiment, a deployable touch fastener may be embedded in a non-woven material layer either during or after the production of the non-woven material. The deployed fastening elements may be sufficiently long such that they extend through the non-woven material layer to engage with a suitable mating material. Depending on the material selected, and the deployable touch fastener design, the non-woven material layer may act as a structural backing for a deployed touch fastener. This may be of particular benefit when the deployed touch fastener does not have sufficient integrity to serve as a touch fastener by itself. Additionally, the non-woven material used in such an embodiment may offer a low-cost method for providing sufficient structural integrity to a deployable touch fastener. Similar to the above, in some embodiments, the non-woven material may also act as a mating fastener element thus allowing the deployed fastener to be mated to itself in a face to face orientation or in a face to back orientation.

For some applications, a deployable touch fastener may be attached to a temporary material layer including an appropriate adhesive. The temporary material layer may be selectively removable from the touch fastener. In some embodiments, the deployed fastening elements may be elastically deformed to an undeployed position and attached to the material layer. However, some amount of inelastic deformation may also occur. In view of the above, the deployable touch fastener may be forced to remain in an undeployed state due to the temporary material layer holding the fastening elements in the undeployed state. Further, upon removal of the adhesive tape, the fastening elements may return to the deployed state. While a temporary material layer used to restrain deployment of fastening elements in a substrate might be used with a deployable touch fastener, it might also be used with a typical touch fastener formed by actively deforming fastening elements to a deployed state as well.

In some embodiments, it may be desirable to provide features to improve bonding of a deployable touch fastener to another material or a material layer applied to the deployable touch fasteners as described above. In such an embodiment, the deployable touch fastener may also include one or more anchoring elements deployed on a surface opposite the surface on which one or more fastening elements are deployed. These anchoring elements may serve to enhance the attachment of the deployable touch fastener onto an adhesive coated surface and/or they may be embedded into a surface of another material the deployable touch fastener is attached to such as molded polyurethane foams, injection molded and/or compression molded polymers, paper or wood like materials, composite materials, roofing materials such as shingles, insulation, and/or other appropriate materials. Depending on the embodiment, the anchoring elements may be formed in a method similar to that described above for the deployable fastening elements. More specifically, the anchoring elements may include a loop, a head, or other appropriate fastening portion as well as one or more stems, one or more deployment links, or other structures capable of selectively deploying the anchoring elements. Other embodiments in which the anchoring elements are separately formed and/or attached to the deployable touch fastener are also contemplated. Additionally, while the above embodiments are directed to anchoring elements that are deployed at the same time as the fastening elements in response to deformation of a touch fastener substrate, embodiments in which the anchoring elements are deployed in a separate processing step are also contemplated.

In some instances, it may be desirable to reinforce either portions of the touch fastener substrate and/or the deployable fastening elements themselves. This reinforcement may be accomplished in any number of ways and may be applied either to discrete sections of the deployable touch fastener or the entire touch fastener. Several non-limiting embodiments of ways to reinforce a touch fastener are described in more detail below.

Figure 24A:
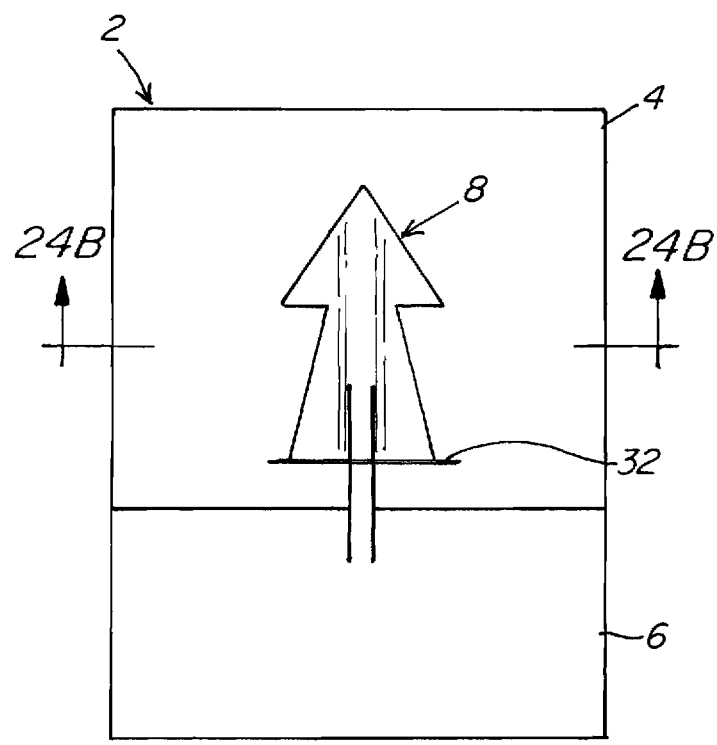
FIG. 24A is a schematic representation of a deployable touch fastener including an embossed surface.
Figure 24B:
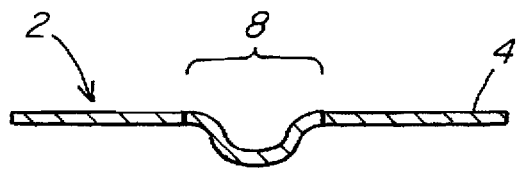
FIG. 24B is a schematic cross-sectional view of the deployable touch fastener taken along line 24B-24B of FIG. 24A.

In one embodiment, a deployable touch fastener may be selectively reinforced or weakened by embossing patterns onto the touch fastener substrate prior to, during or after, a die cutting process. The applied pattern may either be applied to a substrate of the deployable touch fastener, the deployable fastening elements, and/or a combination of the two to provide a desired reinforcement. In such an embodiment, the selective reinforcement of the substrate, deployment links, and/or deployable fastening elements may be due to a change in the material thickness or geometry associated with the embossed pattern. For example, as shown in FIGS. 24A and 24B, an embossing process may be performed on a substrate 2 to create a curvature along the length of a fastening element 8, somewhat like a shape of a venetian blind slat. Alternatively, an embossing process may create a crease 32 at a location to favorably bias the deployment of the fastening element 8 in a desired direction. It should be understood that a crease 32 may be located in a portion of a substrate, a deployment link, fastening element, and/or any appropriate location to bias a deployment direction of the deployable touch fastener. For example, if a crease is formed at a desired hinge point 32, it may cause molecular orientation of the hinge material and improve the performance or longevity of the hinge during subsequent deployment and retraction of the fastening element.

In another embodiment, a surface of the substrate material may either be coated along the entire substrate surface or it may be selectively coated in a pattern using an appropriate material. The applied pattern may either be applied to a substrate of the deployable touch fastener, the deployable fastening elements, and/or a combination of the two to provide a desired reinforcement. Additionally, this selectively applied material may favorably bias the deployment of the fastening elements in a desired direction. For example, coating one entire face of a deployable touch fastener substrate may favorably bias the deployment of the elements due to the different mechanical response of the coating as compared to the underlying substrate material. Regarding the above coatings, in some embodiments, the coatings may saturate a substrate they are applied to such as, for example, a paper substrate saturated with a polymer, epoxy, or other material.

While the above embodiments have been directed to modifying the substrate and/or fastening elements to bias the deployment of the fastening elements, in some embodiments, it is desirable to bias deployment of the fastening elements using an appropriate device or deployment method. In one embodiment, a substrate including a plurality of deployable fastening elements formed in the substrate is passed over a pressure or vacuum source while the substrate is deformed to deploy the fastening elements. The pressure or vacuum source applies a force to the fastening elements as they are being deployed to bias their deployment to a particular surface of the substrate. Alternatively, in another embodiment, a substrate including a plurality of deployable fastening elements formed in the substrate is rolled over, bent around, or otherwise passed over a roller, bar, or other rounded surface in order to deform the substrate. Without wishing to be bound by theory, deforming the substrate around a rounded surface applies a compressive stress to the interior surface of the substrate adjacent to the rounded surface and a tensile stress to the exterior surface of the substrate. This differential stress biases the deployment of the plurality of fastening elements toward a desired direction away from the substrate surface. Additionally, depending on the particular fastening element geometry, the plurality of fastening elements are biased towards the interior surface of the substrate adjacent to the rounded surface during deployment.

In still yet another embodiment, either a portion and/or the edges of a deployable fastening element may be modified or thickened during formation so as to increase the strength of the fastening element. This may help to prevent the fastening element from being cut or damaged when subjected to a load from a mating element. For example, a laser used to cut a pattern into a substrate to form the one or more deployable fastening elements may cause a bead of resolidified material to form along the cut edges thereby reinforcing the formed edge. Without wishing to be bound by theory, forming a bead of material along the edges forming the fastening elements may also help to reduce the notch sensitivity of the formed fastening element.

While, the deployable touch fasteners described herein and depicted in the figures are directed to planar substrate geometries such as strips, sheets, webs, and films, it should be understood that the substrate geometry of a deployable touch fastener is not limited to a planar geometry. Instead, various other substrate geometries may be used to form a deployable touch fastener. For example, substrates might be corrugated, cylindrical, triangular, square or any other appropriate shape or configuration that permits one or more deployable fastening elements to be formed therein and subsequently deployed. In one specific embodiment, a tubular substrate with one or more deployable fastening elements formed therein may be slid over an expandable or inflatable mandrel and then inserted into a recess lined with, or constructed from, an appropriate mating material. The tubular substrate may then be expanded or inflated to deploy the fastening elements and engage with the mating material. Alternatively, a tubular substrate may be expanded to deploy the associated deployable fastening elements and compressed to undeploy the fastening elements. In such an embodiment, the tubular substrate might be compressed and inserted into a passage including a mating portion of a touch fastener and released in order to deploy the fastening elements and engage the mating material. The fastening elements used in the above embodiments might be designed so as to provide a permanent or reusable attachment as the disclosure is not so limited.

In some instances, it may be desirable to provide a method of visually verifying that one or more fastening elements of a deployable touch fastener are in the deployed state. For example, in one embodiment, an upper surface of the deployable touch fastener may have a first color such as white and a lower surface of the deployable touch fastener may have a second contrasting color such as red. Consequently, when the deployable touch fastener has been stretched to the deployed state, the one or more fastening elements will be located in the deployed state exposing the second contrasting color, red, corresponding to the lower surface which is easily visible against the first color, white. This visual cue of contrasting colors may thus act as a visual verification of fastening element deployment. It should be understood that other appropriate colors, or other appropriate visual indication, might be used. Additionally, other methods of verifying fastening element deployment are also possible.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A touch fastener comprising:
a substrate including a first portion and a second portion displaceable relative to the first portion within a plane of the substrate; and
a first fastening element formed in the first portion, wherein when the first portion is displaced relative to the second portion, a force and/or moment generated by the displacement causes the first fastening element to be deployed from a first undeployed state oriented within the plane of the substrate to a second deployed state that is oriented out of the plane of the substrate.

2. The touch fastener of claim 1, further comprising a first deployment link extending between the first fastening element and the second portion, wherein when the first portion is displaced relative to the second portion, the first deployment link deploys the first fastening element.

3. The touch fastener of claim 2, wherein the deployment link applies a non-symmetrical force to the fastening element when the first portion is displaced relative to the second portion.

4. The touch fastener of claim 1, wherein a shape of the fastening element comprises at least one selected from the group of an arrowhead, a single hook, a double hook, a T, a mushroom, a partial circle, a lightning bolt shape, a sinusoidal shape, a single saw tooth shape, a double sided saw tooth shape, a Y, a star burst, a pointed shape, a straight pin, a tapered pin and a loop.

5. The touch fastener of claim 1, wherein a shape of the fastening element comprises a fastening portion including a throat angled relative to a centerline of the fastening element, wherein the throat extends into the fastening element and away from a base of the fastening element.

6. The touch fastener of claim 5, wherein the throat extends up to at least the centerline of the fastening element.

7. The touch fastener of claim 1, further comprising a deployment stop to limit the relative displacement between the first portion and the second portion.

8. The touch fastener of claim 1, further comprising a second fastening element formed in either of the first portion or the second portion, wherein when the first portion is displaced relative to the second portion the second fastening element is deployed in response to the displacement.

9. The touch fastener of claim 1, wherein the substrate includes a third portion and a second fastening element formed in at least one selected from the group of the first portion, the second portion, and the third portion.

10. The touch fastener of claim 1, wherein the first fastening element includes a fastening portion and a stem, wherein upon deployment, the fastening portion is bent relative to the stem.

11. The touch fastener of claim 1, wherein the displacement of the first portion relative to the second portion is at least partially recoverable to at least partially retract the fastening element.

12. The touch fastener of claim 1, wherein the first portion is continuous with the second portion.

13. The touch fastener of claim 1, wherein the first portion and the second portion are constructed to be displaced away from each other.

14. The touch fastener of claim 1, wherein the first portion and the second portion are constructed to be displaced towards each other.

15. The touch fastener of claim 1, wherein the first portion and the second portion are constructed to be displaced along an interface between the first portion and the second portion.

16. The touch fastener of claim 1, wherein the first fastening element includes a first stem attached to the first portion, a second stem attached to the second portion, and a fastening portion extending between the first stem and the second stem.

17. The touch fastener of claim 16, wherein displacing in the first portion relative to the second portion moves the first stem towards the second stem to deploy the fastening element in response to the displacement.

18. The touch fastener of claim 1, wherein at least one selected from the group of the substrate and the first fastening element is coated with a material.

19. The touch fastener of claim 1, wherein the substrate comprises at least one selected from the group of a polymer, a paper, a paper pre-coated or pre-saturated with a reinforcing material, a metal, a ceramic, a fabric, a composite material, a foamed material, a non-woven material, a woven material, a knitted material, and a glass.

20. The touch fastener of claim 1, wherein the substrate is at least one selected from the group of a sheet, strip, web, and film.

21. The touch fastener of claim 1, wherein the substrate is a laminate.

22. The touch fastener of claim 1, wherein the substrate is bonded to or comprises a diaper tab.

23. The touch fastener of claim 1, wherein the substrate is attached to an automotive seat cushion.

24. The touch fastener of claim 1, further comprising at least one edge seal disposed on the substrate.

25. The touch fastener of claim 1, further a protective material disposed on the first fastening element.

26. A touch fastener comprising:
a substrate having a first portion and a second portion displaceable in a plane of the substrate relative to the first portion; and a first fastening element having sections formed in the first and second portion of the substrate, wherein when the first and second portions are displaced in the plane of the substrate relative to each other, the displacement causes the first fastening element to be deployed out of the plane of the substrate.

27. The touch fastener of claim 26, wherein the displacement causes the first fastening element to be deployed from a first undeployed state in the plane of the substrate to a second deployed state that is out of the plane of the substrate.

28. The touch fastener of claim 26, further comprising a first deployment link extending between the first fastening element and the second portion, wherein when the first and second portions are displaced in the plane relative to each other, the first deployment link deploys the first fastening element.

29. The touch fastener of claim 28, wherein the deployment link applies a non-symmetrical force to the fastening element when the first and second portions are displaced relative to each other.

30. The touch fastener of claim 26, further comprising a deployment stop to limit the relative displacement between the first portion and the second portion.

31. The touch fastener of claim 26, further comprising a second fastening element formed in either of the first portion or the second portion, wherein when the first and second portions are displaced relative to each other, the second fastening element is deployed in response to the displacement.

* * * * *